US011900558B2

(12) United States Patent
Ramirez de Chanlatte et al.

(10) Patent No.: US 11,900,558 B2
(45) Date of Patent: Feb. 13, 2024

(54) RECONSTRUCTING THREE-DIMENSIONAL MODELS OF OBJECTS FROM REAL IMAGES BASED ON DEPTH INFORMATION

(71) Applicant: Adobe Inc., San Jose, CA (US)

(72) Inventors: Marissa Ramirez de Chanlatte, Los Altos, CA (US); Radomir Mech, Mountain View, CA (US); Matheus Gadelha, San Jose, CA (US); Thibault Groueix, Grenoble (FR)

(73) Assignee: Adobe Inc., San Jose, CA (US)

( * ) Notice: Subject to any disclaimer, the term of this patent is extended or adjusted under 35 U.S.C. 154(b) by 128 days.

(21) Appl. No.: 17/520,071

(22) Filed: Nov. 5, 2021

(65) Prior Publication Data

US 2023/0147722 A1 May 11, 2023

(51) Int. Cl.
*G06T 19/20* (2011.01)
*G06N 3/04* (2023.01)
*G06T 7/50* (2017.01)
*G06F 18/214* (2023.01)
*G06T 17/00* (2006.01)

(52) U.S. Cl.
CPC ............ *G06T 19/20* (2013.01); *G06F 18/214* (2023.01); *G06N 3/04* (2013.01); *G06T 7/50* (2017.01); *G06T 17/00* (2013.01); *G06T 2219/2004* (2013.01)

(58) Field of Classification Search
CPC ... G06T 19/20; G06T 7/50; G06T 2219/2004; G06T 17/00; G06F 18/214; G06N 3/04
See application file for complete search history.

(56) References Cited

U.S. PATENT DOCUMENTS

| 2019/0340462 | A1  | 11/2019 | Pao et al. |
| 2021/0142497 | A1* | 5/2021  | Pugh ........................ G06T 7/55 |
| 2021/0279852 | A1* | 9/2021  | Jakka .................. H04N 23/631 |
| 2022/0066544 | A1* | 3/2022  | Kwon ...................... G06T 7/20 |

OTHER PUBLICATIONS

Wang et al., "DISN—Deep Implicit Surface Network for High-quality Single-view 3D Reconstruction", 2019, NeurIPS (Year: 2019).*
Han et al., "Image-Based_3D_Object_Reconstruction_State-of-the-Art_and_Trends_in_the_Deep_Learning_Era",—202105, IEEE (Year: 2021).*

(Continued)

*Primary Examiner* — YuJang Tswei
(74) *Attorney, Agent, or Firm* — Keller Preece PLLC

(57) ABSTRACT

The present disclosure relates to systems, non-transitory computer-readable media, and methods that tune a 3D-object-reconstruction-machine-learning model to reconstruct 3D models of objects from real images using real images as training data. For instance, the disclosed systems can determine a depth map for a real two-dimensional (2D) image and then reconstruct a 3D model of a digital object in the real 2D image based on the depth map. By using a depth map for a real 2D image, the disclosed systems can generate reconstructed 3D models that better conform to the shape of digital objects in real images than existing systems and use such reconstructed 3D models to generate more realistic looking visual effects (e.g., shadows, relighting).

20 Claims, 13 Drawing Sheets

(56) References Cited

OTHER PUBLICATIONS

Li et al., "Model-Driven Feedforward Prediction for Manipulation of Deformable Objects", 200810, IEEE (Year: 2008).*
A. Change, T. Funkhouser, L. Guibas, P. Hanrahan, Q. Huang, Z. Li, S. Savarese, M. Savva, S. Song, H. Su, J Xiao, L. Yi, F. Yu "ShapeNet: An Information-Rich 3D Model Repository" 2015.
D. Shin, C. Fowlkes, D. Hoiem. "Pixels, voxels, and views: A study of shape representations for single view 3D object shape prediction." CVPR 2018.
X. Zhang, Z. Zhang, C. Zhang, J. Tenenbaum, W. Freeman, J. Wu. "Learning to Reconstruct Shapes from Unseen Classes." NeurIPS 2018.
Yin, Zhang, Wang, Niklaus, Mai, Chen, and Shen. "Learning to Recover 3D Scene Shape from a Single Image." CVPR, 2021.
W. Wang, Q. Xu, D. Ceylan, R. Mech and U. Neumann. "DISN: Deep Implicit Surface Network for High-quality Single-view 3D Reconstruction." CVPR, 2019.
A. Thai, S. Stojanov, V. Upadhya, J. Rehg. "3D Reconstruction of Novel Object Shapes from Single Images" Preprint 2021.
B. Ma, Z. Han, Y. Liu, M. Zwicker. "Neural-Pull: Learning Signed Distance Functions from Point Clouds by Learning to Pull Space onto Surfaces." PMLR, 2021.
Lorensen et al., A High Resolution 3D Surface Construction Algorithm, In Computer Graphics, 21(4): 163-169, 1987.

\* cited by examiner

RECONSTRUCTING THREE-DIMENSIONAL MODELS OF OBJECTS FROM REAL IMAGES BASED ON DEPTH INFORMATION

BACKGROUND

In recent years, image editing systems have developed more advanced hardware and software platforms for generating and editing digital images. In particular, conventional image editing systems commonly generate three-dimensional (3D) representations of image objects using 3D geometry processing. To illustrate, some conventional image editing systems can reconstruct 3D representations of digital objects utilizing learned parameters from processing synthetic training images depicting particular objects.

Despite such advances, some conventional image editing often do not represent objects from real images (or from synthetic images depicting dissimilar or new objects) with the same accuracy or quality as objects depicted in training data. For example, some conventional systems exclusively use synthetic images with ground-truth signed distance functions (SDFs) to train a 3D reconstruction network. Such 3D reconstruction networks frequently generate inaccurate 3D representations of target digital objects that fail to conform to the shape of the target digital objects, particularly for real images and synthetic images depicting object classes that differ from the synthetic training images. For example, such 3D reconstruction networks frequently generate low quality 3D models with pixilation or omitted shape/feature details, erroneous shapes and features (e.g., incoherent blobs) that resemble little of the digital object. Exacerbating these inaccuracies, conventional image editing systems cannot consistently generalize reconstruction of 3D models for digital objects portrayed with various scene lightings, surface reflectance, and background.

Because existing systems often cannot transfer the artificial intelligence for reconstructing 3D representations of objects in synthetic training images to objects in real images or to dissimilar objects in other synthetic images, existing systems exhibit a domain gap between objects from synthetic training images, on the one hand, and objects in real images or dissimilar objects in synthetic images, on the other hand. Nor can existing systems train a 3D reconstruction network to improve 3D models for real objects because conventional ground-truth signed distance functions are typically limited to synthetic training images.

In addition to such a domain gap, conventional image editing systems often rigidly require certain complex or commonly unavailable inputs. For example, conventional systems often require commonly unavailable inputs include point clouds, normal maps, 3D meshes or templates, etc. On the training side, many of these inputs are not readily available for real-world images—thereby limiting training datasets to small, unvaried, synthetic datasets that lend to the inaccuracies described above. Similarly, at implementation time, the foregoing inputs required of conventional image editing systems inflexibly add to system complexity. For instance, some conventional inputs increase expend considerable computer resources and slow reconstruction processing speeds on implementing client devices. In some cases, certain client devices (e.g., mobile devices with limited processing capabilities) cannot execute or support conventional 3D reconstruction networks because of data-and-processing heavy training or input data, such as 3D meshes that heavily expend computer resources.

BRIEF SUMMARY

This disclosure describes embodiments of systems, non-transitory computer-readable media, and methods that solve one or more of the foregoing problems in the art or provide other benefits described herein. In particular, the disclosed systems bridge the domain gap in single view three-dimensional (3D) image reconstruction by tuning parameters of a 3D-object-reconstruction-machine-learning model to reconstruct 3D models of objects from real images using real images as training data. For instance, the disclosed systems can determine a depth map for a real two-dimensional (2D) image and then reconstruct a 3D model of a digital object in the real 2D image based on the depth map. By using a depth map for a real 2D image, the disclosed systems can generate reconstructed 3D models that better conform to the shape of digital objects in real images than existing systems and use such reconstructed 3D models to generate more realistic looking visual effects (e.g., shadows, relighting).

To train such a 3D-object-reconstruction-machine-learning model, the disclosed systems can use iterations of both two-dimensional (2D) real-world images and synthetic images with predetermined object data. In particular, the disclosed systems can determine predicted depth maps for real images (without conventional ground truth SDF values) and generate predicted signed distance functions using the 3D-object-reconstruction-machine-learning model to supervise training the 3D-object-reconstruction-machine-learning model. In certain implementations, the disclosed systems can use the predicted signed distance function and a neural-pull method to determine a depth differential among points in a spatial representation of the real 2D image and use such a depth differential to adjust parameters for more accurately predicting signed distance functions.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1A:
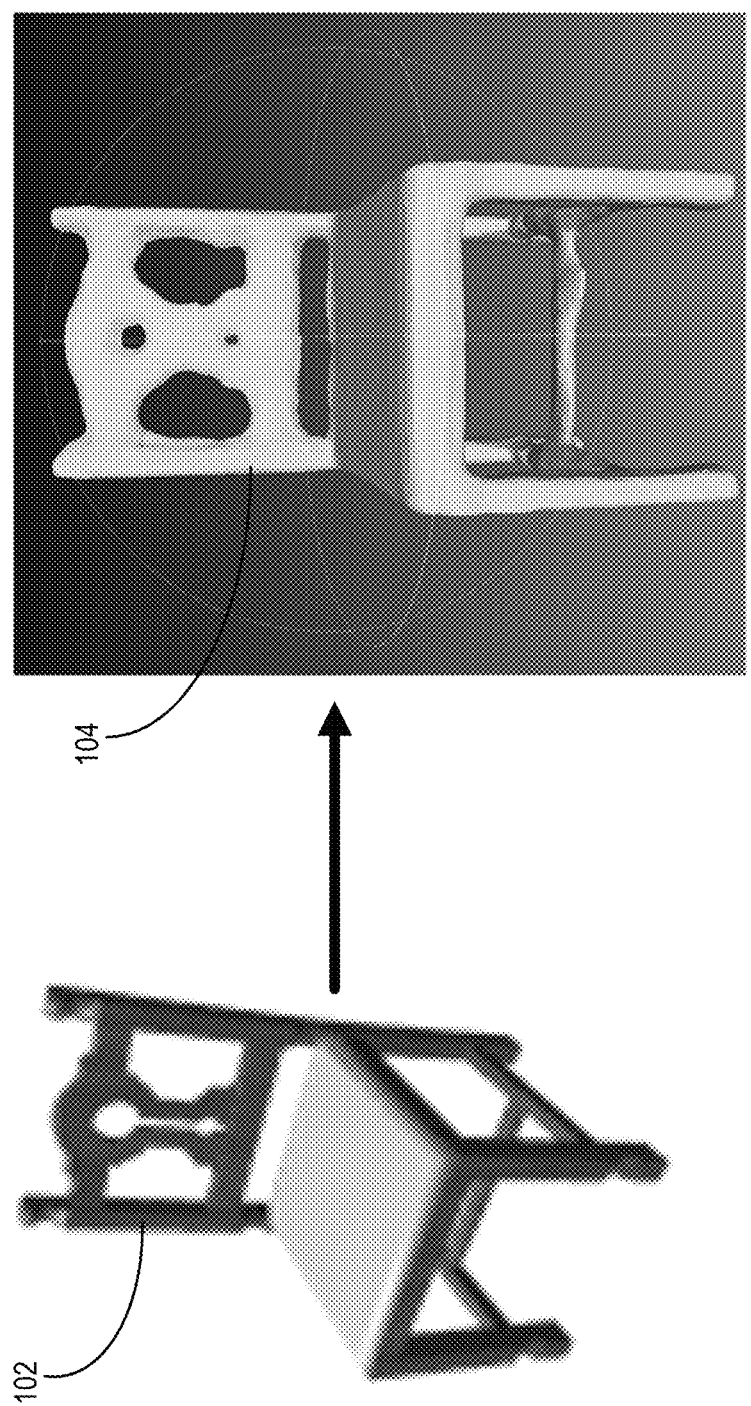
FIGS. 1A-1C illustrate predicted 3D models of objects generated from digital images by a conventional image editing system.

This disclosure describes one or more embodiments of a three-dimensional (3D) object reconstruction system that uses depth maps from real two-dimensional (2D) images to train a 3D-object-reconstruction-machine-learning model to reconstruct 3D models of objects depicted in real 2D images. As explained below, the 3D-object-reconstruction system can tune parameters of the 3D-object-reconstruction-machine-learning model by using real images as training data. By using iterations of both real images and synthetic images to train a 3D-object-reconstruction-neural network or other machine-learning model—and using a first-of-its-kind depth-based training supervision unique to real images as training data—the 3D-object-reconstruction system can generate 3D models of digital objects with outer (e.g., surface) lines or edges that better conform to a shape of a digital object from real images than existing networks or image editing systems.

As just indicated, in one or more embodiments, the 3D-object-reconstruction system trains a 3D-object-reconstruction-machine-learning model (e.g., 3DShapeGen) using real 2D images for certain training iterations. For example, the 3D-object-reconstruction system determines (and feeds into the 3D-object-reconstruction-machine-learning model) a predicted depth map, a segmentation mask, and/or camera position data corresponding to the real 2D image. Based on the predicted depth map and/or other such inputs, the 3D-object-reconstruction-machine-learning model generates a predicted SDF. The 3D-object-reconstruction system subsequently samples, relative to one or more surface depth points, a set of query points in a spatial representation of the real 2D image. Subsequently, the 3D-object-reconstruction system pulls a query point towards a surface depth point according to a predicted SDF value and directional gradient. Once pulled, in one or more embodiments, the 3D-object-reconstruction system determines a depth differential between the pulled point and the surface depth point. The 3D-object-reconstruction system then uses the depth differential to modify one or more learned parameters of the 3D-object-reconstruction-machine-learning model.

As described above, the 3D-object-reconstruction system can identify or determine a depth map for a real 2D image as training data for the 3D-object-reconstruction-machine-learning model instead of ground-truth SDF values. The 3D-object-reconstruction system is agnostic as to the source or method of generating the depth map. For example, in some embodiments, the 3D-object-reconstruction system uses a trained depth map network or other depth-map-machine-learning model to determine a predicted depth map for a real 2D image. In other embodiments, however, the depth map includes ground truth depths or a depth map based on depth information extracted from LIDAR images, stereo images, 3D image frames (e.g., from 3D movies), or multi-view images with overlapping captured content.

Based on the predicted depth map, a segmentation mask, and/or camera position data, the 3D-object-reconstruction-machine-learning model generates a predicted SDF. The 3D-object-reconstruction system subsequently uses SDF values from the predicted SDF to determine a loss (e.g., a depth differential) using a first-of-its-kind loss function without utilizing ground-truth SDF values. To illustrate, in some cases, the 3D-object-reconstruction system generates a spatial representation of the real 2D image. Within the spatial representation, the 3D-object-reconstruction system determines query points based on learned parameters and a depth map comprising disparity values for the real 2D image. These query points are positioned an unknown distance away from one or more surface depth points representing a surface or outer line of the digital object depicted in the real 2D image. The 3D-object-reconstruction system then pulls one or more query points towards a surface depth point according to a predicted SDF value and a directional gradient. Subsequently, the 3D-object-reconstruction system determines a depth differential (e.g., L2 norm or Euclidean distance) between the pulled point and the surface depth point-based on a segmentation mask for the real 2D image, the query point, the SDF value, the directional gradient, and a noise metric.

As further indicated above, in one or more embodiments, the 3D-object-reconstruction system also trains the 3D-object-reconstruction-machine-learning model using synthetic images for certain training iterations. For instance, the 3D-object-reconstruction system identifies (and feeds into the 3D-object-reconstruction-machine-learning model) a segmentation mask for a synthetic 2D image depicting a digital object. From the segmentation mask, the 3D-object-reconstruction-machine-learning model then generates a predicted SDF representing predicted SDF values between query points and additional surface depth points in a spatial representation of the synthetic 2D image. Subsequently, the 3D-object-reconstruction system determines a loss between ground truth SDF values and the predicted SDF values utilizing a loss function. Based on the loss, the 3D-object-reconstruction system then modifies one or more learned parameters of the 3D-object-reconstruction-machine-learning model.

In contrast to real-image-training iterations, the 3D-object-reconstruction system does not use depth maps for synthetic-image-training iterations of the 3D-object-reconstruction-machine-learning model. Indeed, synthetic images (e.g., from ShapeNet, TurboSquid, ADOBE® Stock 3D, RenderPeople) include predetermined 3D object data from which 3D object ground truth data may be derived. For example, in certain synthetic-image-training iterations, the 3D-object-reconstruction system determines a segmentation mask for a synthetic 2D image. Subsequently, the 3D-object-reconstruction system trains the 3D-object-reconstruction-machine-learning model using the segmentation mask as a training input to focus object reconstruction on image portions corresponding to a digital object. Specifically, the 3D-object-reconstruction-machine-learning model generates predicted SDF values for the synthetic 2D image based on the segmentation mask.

Additionally, during a synthetic-image-training iteration, the 3D-object-reconstruction system compares the predicted SDF values and the ground-truth SDF values to generate a loss. For example, the 3D-object-reconstruction system uses a loss function specific to synthetic images to compare a predicted SDF value and a ground truth SDF value. Based on the loss, the 3D-object-reconstruction system updates one or more learned parameters of the 3D-object-reconstruction-machine-learning model. Accordingly, in some embodiments, the 3D-object-reconstruction system can use training data from synthetic images supplemented by training data from real 2D images to train the 3D-object-reconstruction-machine-learning model until convergence, an iteration threshold, or some other training criteria is satisfied.

After training, in some embodiments, the 3D-object-reconstruction-machine-learning model efficiently and flexibly generates predicted SDF values for reconstructing a 3D model of a digital object in a view-centric reference frame of a real 2D image. For instance, at implementation time, the 3D-object-reconstruction system determines a depth map for the real 2D image. Subsequently, the 3D-object-reconstruction system uses one or more layers of the 3D-object-reconstruction-machine-learning model to condition or generate parameters based on the depth map. Using these parameters, the 3D-object-reconstruction-machine-learning model estimates SDF values for reconstructing a reconstructed 3D model of a digital object portrayed in the real 2D image. In one or more embodiments, the 3D-object-reconstruction system uses the reconstructed 3D model of the digital object for transferring a graphical depiction of the digital object to a 3D image editing application, relighting the graphical depiction of the digital object within an additional 2D image, or adjusting various visual effects (e.g., shadows) based on the 3D model of the digital object within the real 2D image.

As just indicated, in one or more embodiments, the 3D-object-reconstruction system can reconstruct a 3D model of the digital object for various applications or use cases. For example, in some embodiments, the 3D-object-reconstruction system can provide a graphical depiction of the digital object for display within a graphical user interface of a 3D image editing application. Further, in some use cases, the 3D-object-reconstruction system provides a graphical depiction of the digital object for display within an additional digital image (e.g., for image relighting).

In addition to depicting the digital object, in some cases, the 3D-object-reconstruction system provides, for display within a graphical user interface, a visual effect derived from the reconstructed 3D model. To illustrate, the 3D-object-reconstruction system may identify a user input to modify the real 2D image by repositioning the digital object associated with a shadow. In response, the 3D-object-reconstruction system generates, as the visual effect, a modified shadow that corresponds to the reconstructed 3D model and a modified position of the digital object within the real 2D image.

As suggested above, the 3D-object-reconstruction system can improve 3D model accuracy and system flexibility relative to conventional image editing systems. For example, the 3D-object-reconstruction system can more accurate and realistic reconstructed 3D models of a digital object from real images and object classes that differ from standard synthetic training images. Specifically, the 3D-object-reconstruction system can provide added training variation for increased model robustness by training a 3D-object-reconstruction-machine-learning model using at least real images and (in some cases) both real and synthetic images. With more robust, varied training, the 3D-object-reconstruction-machine-learning model can generate more accurate SDFs that result in 3D models that better conform to shapes of digital objects—including digital objects of classes or categories of objects outside of training datasets.

In addition to improved accuracy, the 3D-object-reconstruction system can improve system flexibility by utilizing easily attainable depth maps as part of the training process and at implementation time. For example, the 3D-object-reconstruction system utilizes a first-of-its-kind 3D-object-reconstruction-machine-learning model that can use depth maps for real 2D images to generate predicted SDFs for 3D object reconstruction. Thus, unlike conventional image editing systems that exclusively use synthetic images for training, the 3D-object-reconstruction system can additionally train on real 2D images using depth maps. Accordingly, at training, the 3D-object-reconstruction system can flexibly use depth maps (derived from one or more of a variety of sources) to generate a predicted SDF and determine a depth differential based on the predicted SDF. Unique to real images, the 3D-object-reconstruction system uses a first-of-its-kind loss function captures this depth differential as the loss for updating one or more learned model parameters. Additionally, at implementation time (post-training), the 3D-object-reconstruction system can flexibly use depth maps to generate predicted SDFs without additional, complex inputs like point clouds, normal maps, 3D meshes or templates, etc.

As explained below, in some embodiments, the 3D-object-reconstruction system implements an ordered combination of specific computing actions to train 3D-object-reconstruction system to generate high-fidelity 3D models of objects. In particular, in some cases, the 3D-object-reconstruction system trains the 3D-object-reconstruction-machine-learning model based on training inputs that include a depth map, segmentation mask, and camera position data. Based on the training inputs for a real 2D image training iteration, the 3D-object-reconstruction-machine-learning model subsequently generates predicted SDF values to be evaluated using a first-of-its-kind loss function described above. In some embodiments, the foregoing process for real 2D image training iterations constitutes a combined order of specific computing actions that trains the model to generate 3D models of objects in real images with improved fidelity to the object shape compared to existing machine-learning models. The 3D-object-reconstruction system can also implement a combined order of specific networks at implementation time. For example, a depth map network combined with the 3D-object-reconstruction-machine-learning model constitutes a unique combination of networks that enables the 3D-object-reconstruction system to generate higher quality 3D models with outer lines that better conforms to an object shape depicted in a real image.

As illustrated by the foregoing discussion, the present disclosure utilizes a variety of terms to describe features and benefits of the 3D-object-reconstruction system. Additional detail is now provided regarding the meaning of these terms. For example, as used herein, the term "real 2D image" refers to a two-dimensional image depicting real-world or physical objects as captured by a camera. In particular embodiments, a real 2D image includes a real-world image that depicts a digital object from the real or physical world (e.g., a human character, inanimate object, or animate object). To illustrate, a real 2D image includes an RGB (red, green, blue) image of a car or other object captured by a client device (e.g., a mobile device) associated with a user. In some cases, unlike synthetic images, a real 2D image is not associated with ground truth SDF values.

Relatedly, the term "synthetic image" refers to a computer-generated or constructed image that is generated or altered to include a computer graphic. In some cases, a synthetic image includes a digital image creating using modelling computations of compiled data. Additionally, in certain cases, a synthetic image corresponds to ground truth SDF values. For example, a synthetic image can correspond to ground truth SDF values for query points around an object surface of a depicted digital object. In some instances, a synthetic image includes one or more images from a 2D dataset or a 3D dataset (e.g., ShapeNet, TurboSquid, ADOBE® STOCK, RenderPeople, ADOBE® ShapeSense).

Additionally, as used herein, the term "depth map" refers to an image or an image channel that includes or represents depth information, distances, or relative proximity to points in an image from a viewpoint. In particular embodiments, a depth map includes disparity values between points, such as relative depth or distance values. Further, in some embodiments, a depth map includes predicted depth values, ground truth depth values, or depth values derived from one or more sources. For instance, a depth map can include depth information derived from LIDAR (light detection and ranging) images, stereo images, or multiple images from different viewpoints, etc.

As also used herein, the term "reconstructed 3D model" refers to a three-dimensional mathematical or geometric representation of a digital object for images. In particular embodiments, a reconstructed 3D model includes a mesh or a wire-frame model used in 3D computer graphics. In some embodiments, a reconstructed 3D model includes a graphical depiction (e.g., a visual formation of a mesh that conforms to a 3D shape surface or curvature).

Relatedly, the term "mesh" refers to a collection of polygons corresponding to a reconstructed 3D model of a digital object. In particular, in one or more embodiments, a mesh includes a collection of polygons comprising vertices, edges, and areas (e.g., areas bounded by the vertices and edges) that correspond to the shape of an object portrayed within a digital image. In one or more embodiments, a mesh may be mathematically represented or visually represented. For example, in some instances, a mesh refers to a collection of polygons that correspond to an edge portrayed in a digital image. In some cases, a mesh includes triangles. In some instances, a mesh includes quadrilaterals. In some implementations, a mesh includes a combination of triangles, quadrilaterals, and/or polygons having additional sides. The 3D-object-reconstruction system can modify pixels of a digital image by detecting changes (e.g., positional changes) to a corresponding mesh of a digital object.

Further, as used herein, the term "3D-object-reconstruction-machine-learning model" refers to one or more machine-learning models for generating values or other outputs for a reconstructed 3D model of an object. In particular embodiments, a 3D-object-reconstruction-machine-learning model comprises one or more neural network layers (e.g., convolutional layers, fully connected layers) that in combination can predict SDF values for a reconstructed 3D model based on a depth map for real images and a segmentation mask for synthetic images. An example of such a 3D-object-reconstruction-machine-learning model comprises a ShapeGen network architecture, as disclosed in Thai et al., 3D Reconstruction Of Novel Object Shapes From Single Images, (Sep. 1, 2021), archived at arxiv.org/pdf/2006.07752.pdf, (hereafter "Thai et al."), the contents of which are expressly incorporated herein by reference. As another example, in some embodiments, a 3D-object-reconstruction-machine-learning model includes a deep implicit surface network (DISN) or an occupancy network (OccNet) as described by Wang et al., DISN: Deep Implicit Surface Network For High-Quality Single-View 3D Reconstruction, In 33rd Conf. on Neural Info. Proc. Systems (NeurIPS 2019), archived at arxiv.org/pdf/1905.10711.pdf, (hereinafter "Wang et al."), the contents of which are expressly incorporated herein by reference.

As used herein, the term "signed distance function" or "SDF" refers to a mathematical expression that defines or determines distances of one or more points within a bounded space for a set of points. For instance, an SDF can include a mathematical express that determines distances between or among points of a 3D shape withing a metric space (e.g., Euclidean space). An SDF has positive values at points inside a surface-bounded Euclidean space and negative values outside the surface-bounded Euclidean space (albeit the opposite may apply for the alternative convention). The boundary of the Euclidean space between positive and negative SDF values corresponds to an object surface. Accordingly, SDF values for an SDF decrease the closer a point is to the boundary (i.e., the object surface), where the SDF value is zero. Relatedly, the term "surface depth point" refers to a particular point along the boundary between positive and negative SDF values corresponding to an object surface where the SDF value is zero.

In addition, the term "spatial representation" refers to portions of a space that includes spatial regions inside and outside of a bounded Euclidean space corresponding to a digital object portrayed in a digital image. In particular embodiments, a spatial representation refers to a space relative to an object surface for evaluating a predicted SDF. For example, in a spatial representation, the 3D-object-reconstruction system can determine a query point, a pulled point, a surface depth point, disparity values between points, etc. for evaluating a predicted SDF.

As used herein, the term "query point" refers to a point within a spatial representation that has been perturbed or otherwise moved away from a point representing an object's surface for query. In particular embodiments, a query point includes a point positioned at a certain sampled distance away from values or a point representing an object's surface (whether inside or outside a digital object) such that a query point has a positive SDF value or a negative SDF value. Moreover, a query point can be pulled or otherwise moved back towards a surface depth point for evaluating a predicted SDF value (e.g., determining a depth differential).

Relatedly, the term "pulled point" refers to a modified position of a query point after having been pulled back towards a surface depth point. In particular embodiments, a pulled point includes a position that relates by distance to a query point by an SDF value and a directional gradient. For example, a pulled point is positioned a distance magnitude of an SDF value away from a query point. Additionally, for example, a pulled point is positioned along or against a query point's directional gradient (e.g., the partial derivatives of a SDF at a query point indicating a direction of the fastest signed distance increase in 3D space).

As used herein, the term "depth differential" refers to a difference of depth between points in a spatial representation. In particular embodiments, a depth differential includes a depth-based loss or difference for a predicted SDF. For example, a depth differential includes a loss that, according to a loss function for real 2D images, is based on a predicted SDF value, directional gradient, segmentation mask, noise-perturbed query point, and a noise metric.

In addition, the term "noise metric" refers to a value representing (or an amount of) noise perturbation. In particular embodiments, a noise metric includes a value representing noise applied to a query point. For example, a noise metric includes an amount of noise perturbation $\in_i$ approximately equal to covariance elements $\sigma^2$ of an isotropic Gaussian function $\mathcal{N}$ (0, σI), where l represents the number of query points.

In addition, the term "view-centric frame of reference" refers to a viewpoint of a digital image. In particular embodiments, a view-centric frame of reference refers to the orientation of a digital object as originally captured or depicted in a digital image. For example, a view-centric frame of reference can capture digital objects in orientations other than the poses or orientations of an object-centric frame of reference—which exclusively depicts objects in their canonical pose.

As also used herein, the term "camera position data" refers to information indicating or about a camera positioning for a digital image. For example, camera position data can include various camera parameters, such as tilt or angle, camera rotation, and camera elevation. In one or more embodiments, camera position data can be absolute (e.g., in terms of a fixed axis, such as a gravitational vertical axis and/or a horizontal ground plane). In other embodiments, camera position data can be relative to the subject captured in a digital image (e.g., a camera elevation relative to a digital object depicted in a digital image).

As used herein, the term "visual effect" refers to a graphic or filter generated by a computing device based on a 3D reconstructed model. In particular embodiments, a visual effect includes a graphic or filter generated within an environment depicted in a digital image. For example, a visual effect includes optical modifications (e.g., a shadow or other lighting effects), compositing, match moving, rigging (e.g., skeletal animation or object deformation), etc.

Further, as used herein, the term "segmentation mask" refers to an image indicating a first set of pixels as corresponding to an object and a second set of pixels as not corresponding to the object. For example, a segmentation mask includes a binary-colored image that associates each pixel with a binary value (0 or 1) or a binary pixel color value (0 for black and 255 for white) to indicate whether the pixel corresponds to a digital object.

As used herein, the term "machine-learning model" refers to a model that can be tuned (e.g., trained) based on inputs to approximate unknown functions. In particular, the term machine-learning model can include a model of interconnected neurons arranged in layers that communicate and learn to approximate complex functions and generate outputs based on a plurality of inputs provided to the model. For instance, the term machine-learning model includes one or more machine learning algorithms or neural network works. In particular, the term machine-learning model includes deep convolutional neural networks (i.e., "CNNs"), fully convolutional neural networks (i.e., "FCNs"), or recurrent neural networks ("RNNs") such as long short-term memory neural networks ("LSTMs"). In other words, a neural network is an algorithm that implements deep learning techniques or machine learning that utilizes a set of algorithms to attempt to model high-level abstractions in data.

A particular example of a machine-learning model includes a segmentation-machine-learning model. As used herein, the term "segmentation-machine-learning model" refers to a computational model for segmenting a digital image or an object portrayed in a digital image. An example of segmentation-machine-learning model includes a salient object segmentation neural network (e.g., as described by Pao et al. in U.S. patent application Ser. No. 15/967,928 filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, hereafter "Pao," the contents of which are expressly incorporated herein by reference). Another example of segmentation-machine-learning model may include foreground/background segmentation algorithms.

Figure 1B:
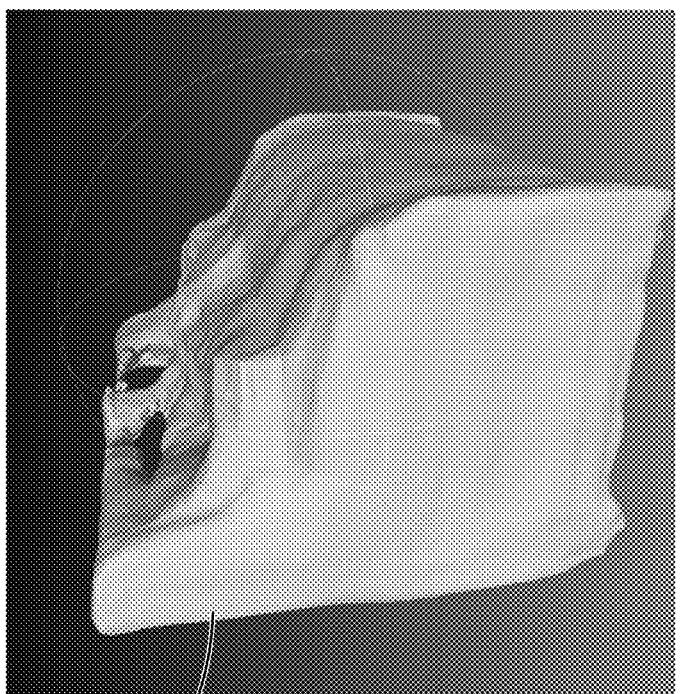
Figure 1B:
Figure 1B:
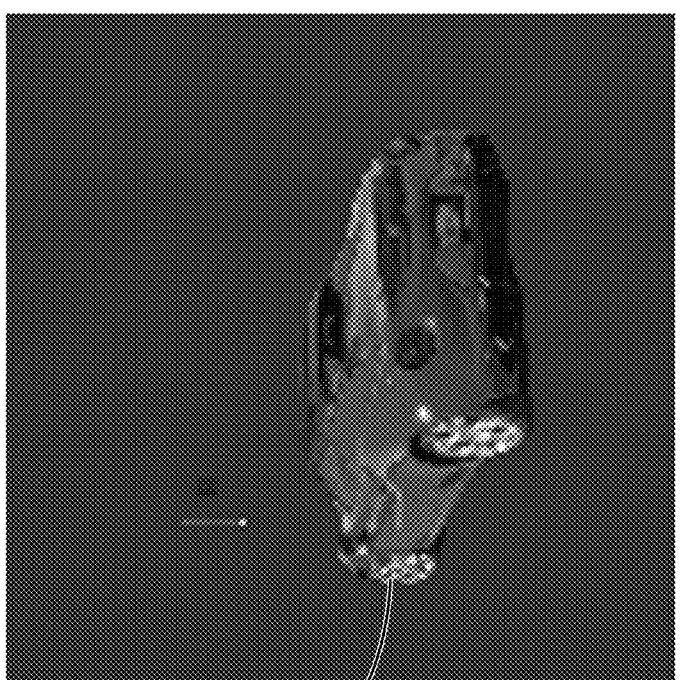
Figure 1C:
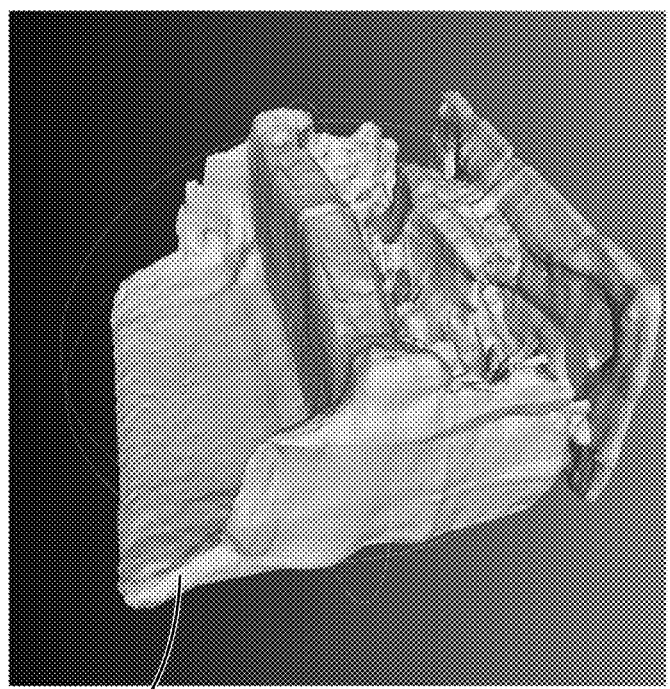
Figure 1C:
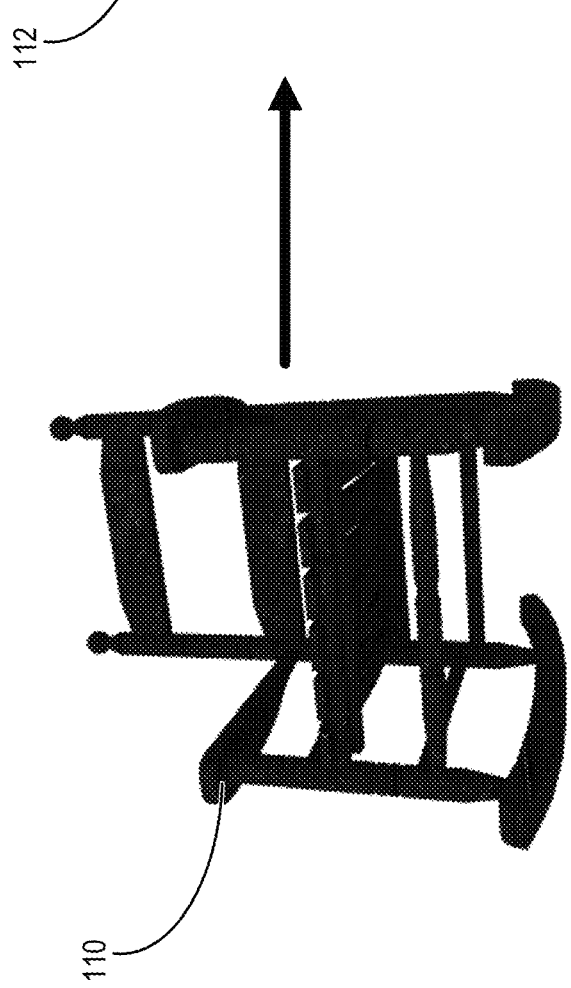

Additional detail will now be provided regarding some conventional image editing systems. For example, FIGS. 1A-1C illustrate predicted 3D models of objects generated from digital images by a conventional image editing system using ShapeNet. For the predicted 3D models shown in FIGS. 1A-1C, researchers used a neural network (e.g., ShapeGen) trained exclusively using a synthetic dataset (e.g., ShapeNet images) comprising basic, four-legged chairs.

As shown in FIG. 1A, the conventional image editing system processes the input image 102 depicting a basic, four-legged chair with a backrest but no armrests. Although not part of the training dataset, the input image 102 depicts a simplistic chair that is part of the same object class as the digital objects included in the training dataset. Based on the input image 102, the conventional image editing system generates a predicted 3D model 104 that mimics the overall shape and certain details of the chair depicted in the input image 102 with relative accuracy.

In contrast, FIGS. 1B and 1C respectively show input images 106 and 110 depicting digital objects of different object classes than used for the training dataset. Specifically, in FIG. 1B, the conventional image editing system processes the input image 106 depicting a car. Based on the input image 106, the conventional image editing system generates a predicted 3D model 108 that resembles nothing of the shape and details of the car depicted in the input image 106. Indeed, the predicted 3D model 108 comprises an amorphous blob that resembles a couch or piano.

In FIG. 1C, the conventional image editing system processes the input image 110 depicting a rocking chair with armrests. Based on the input image 110, the conventional image editing system generates a predicted 3D model 112 that similarly resembles little of the shape or details of the rocking chair depicted in the input image 110. Surprisingly, the conventional image editing system was unable to generate an accurate 3D model of the rocking chair despite similarities between a rocking chair and a basic chair. Thus, conventional image editing systems are sensitive to additions of even minor features (e.g., armrests and a rocking base attached to the four chair legs) that differ from features in the training dataset. As indicated by FIGS. 1B and 1C, conventional image editing systems cannot accurately reconstruct 3D models in generalized cases that extend to different object classes of digital objects than utilized in training datasets.

Figure 2:
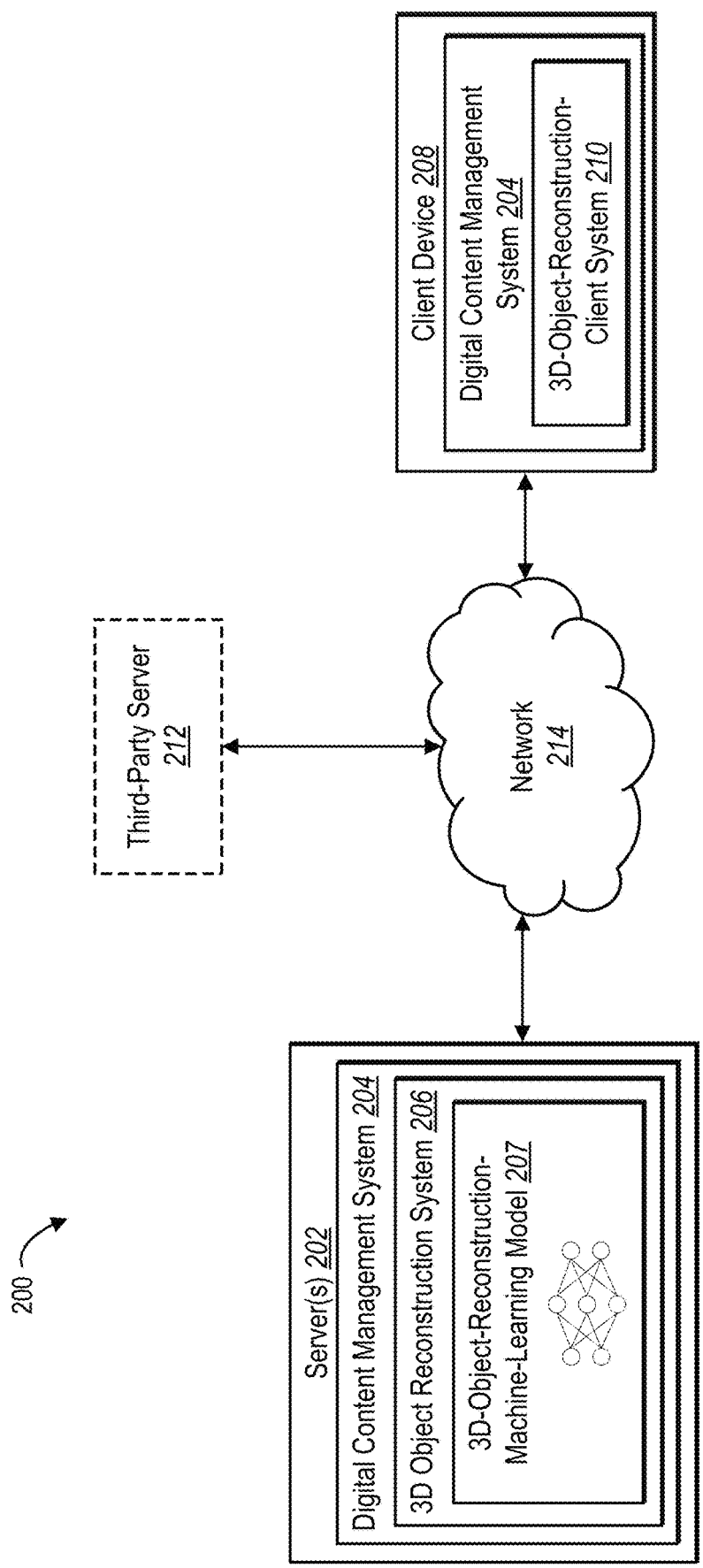
FIG. 2 illustrates a computing system environment for implementing a 3D-object-reconstruction system in accordance with one or more embodiments.

In contrast, the 3D-object-reconstruction system can improve 3D model accuracy and flexibility as described below in relation to illustrative figures portraying example embodiments and implementations of the 3D-object-reconstruction system. For example, FIG. 2 illustrates a computing system environment (or "environment") 200 for implementing a 3D-object-reconstruction system 206 in accordance with one or more embodiments. As shown in FIG. 2, the environment 200 includes server(s) 202, a client device 208, an optional third-party server 212, and a network 214. Each of the components of the environment 200 communicate (or are at least configured to communicate) via the network 214, and the network 214 may be any suitable network over which computing devices can communicate. Example networks are discussed in more detail below in relation to FIG. 8.

As further illustrated in FIG. 2, the environment 200 includes the server(s) 202. In some embodiments, the server(s) 202 comprises a content server and/or a data collection server. Additionally or alternatively, the server(s) 202 comprise an application server, a communication server, a web-hosting server, a social networking server, or a digital content management server.

Moreover, as shown in FIG. 2, the server(s) 202 implement a digital content management system 204. In one or more embodiments, the digital content management system 204 generates, receives, edits, manages, and/or stores digital videos or digital images. For example, in some instances, the digital content management system 204 accesses one or more digital images for transmitting to at least one of the 3D-object-reconstruction system 206 or the client device 208. In other instances, the digital content management system 204 receives reconstructed 3D models of digital objects from at least one of the 3D-object-reconstruction system 206 or the client device 208 (e.g., for storing in cloud storage hosted on the server(s) 202 via the network 214).

Utilizing a 3D-object-reconstruction-machine-learning model 207, the 3D-object-reconstruction system 206 can efficiently and accurately generate a reconstructed 3D model of a digital object from a digital image. To illustrate, in one or more embodiments, the 3D-object-reconstruction system 206 determines a depth map for a real 2D image depicting a digital object. Additionally, in some embodiments, the 3D-object-reconstruction system 206 generates, based on the depth map, a reconstructed 3D model of the digital object comprising outer lines that conform to a shape of the digital object by utilizing the 3D-object-reconstruction-machine-learning model 207 trained on a plurality of real 2D images. Further, in certain implementations, the 3D-object-reconstruction system 206 provides, for display within a graphical user interface, a graphical depiction of the reconstructed 3D model or a visual effect derived from the reconstructed 3D model.

To do so, the 3D-object-reconstruction system 206 trains the 3D-object-reconstruction-machine-learning model 207 utilizing a training process that includes training on real 2D images and synthetic images. For example, the 3D-object-reconstruction system 206 determines a predicted depth map and a segmentation mask for a real 2D image depicting a digital object. Subsequently, the 3D-object-reconstruction system 206 generates, utilizing the 3D-object-reconstruction-machine-learning model 207, a predicted signed distance function based on the predicted depth map and the segmentation mask. In one or more embodiments, the 3D-object-reconstruction system 206 then pulls a query point in a spatial representation of the real 2D image towards a surface depth point in the spatial representation by moving the query point to a pulled point according to the predicted signed distance function. In some embodiments, the 3D-object-reconstruction system 206 generates a depth differential between the pulled point and the surface depth point in the spatial representation. Further, in certain implementations, the 3D-object-reconstruction system 206 modifies one or more learned parameters of the 3D-object-reconstruction-machine-learning model 207 based on the depth differential.

As shown in FIG. 2, the environment 200 includes the client device 208. The client device 208 can include one of a variety of computing devices, including a smartphone, tablet, smart television, desktop computer, laptop computer, virtual reality device, augmented reality device, or other computing device as described in relation to FIG. 8. Although FIG. 2 illustrates a single client device 208, in some embodiments, the environment 200 includes multiple client devices 208 (e.g., multiple mobile computing devices connected to each other via the network 214). Further, in some embodiments, the client device 208 receives user input and provides information pertaining to accessing, viewing, modifying, generating, and/or interacting with a digital image to the server(s) 202.

Moreover, as shown, the client device 208 includes the digital content management system 204 and a 3D-object-reconstruction-client system 210. In particular embodiments, the 3D-object-reconstruction-client system 210 comprises a web application, a native application installed on the client device 208 (e.g., a mobile application, a desktop application, a plug-in application, etc.), or a cloud-based application where part of the functionality is performed by the server(s) 202. In some embodiments, the 3D-object-reconstruction-client system 210 presents or displays information to a user associated with the client device 208, including reconstructed 3D models as provided in this disclosure.

In additional or alternative embodiments, the 3D-object-reconstruction-client system 210 represents and/or provides the same or similar functionality as described herein in connection with the 3D-object-reconstruction system 206. In some implementations, the 3D-object-reconstruction-client system 210 supports the 3D-object-reconstruction system 206 on the server(s) 202. Indeed, in one or more embodiments, the client device 208 includes all, or a portion of, the 3D-object-reconstruction system 206.

As further shown in FIG. 2, the environment 200 optionally includes the third-party server 212. In one or more embodiments, the third-party server 212 comprises a content server and/or a data collection server. Additionally or alternatively, the third-party server 212 comprises an application server, a communication server, a web-hosting server, a social networking server, or a digital content management server—including a synthetic image database. In other embodiments, the third-party server 212 comprises a storage server, a cloud-based data store, etc. for accessing digital images for training and/or implementation purposes.

In some embodiments, though not illustrated in FIG. 2, the environment 200 has a different arrangement of components and/or has a different number or set of components altogether. For example, in certain embodiments, the client device 208 communicates directly with the server(s) 202, bypassing the network 214.

As mentioned above, the 3D-object-reconstruction system 206 can flexibly and accurately generate a reconstructed 3D model of an object in a digital image utilizing a depth map of the digital image (e.g., without other inputs like normal maps, input meshes, or point clouds). For example, the 3D-object-reconstruction system 206 can utilize a 3D-object-reconstruction-machine-learning model to predict a SDF of a digital object. From the predicted SDF, the 3D-object-reconstruction system 206 can generate a reconstructed 3D model and (in some cases) provide a graphical depiction of (or a visual effect derived from) the reconstructed 3D model. In accordance with one or more such embodiments, FIG. 3 illustrates the 3D-object-reconstruction system 206 generating a reconstructed 3D model.

Figure 3:
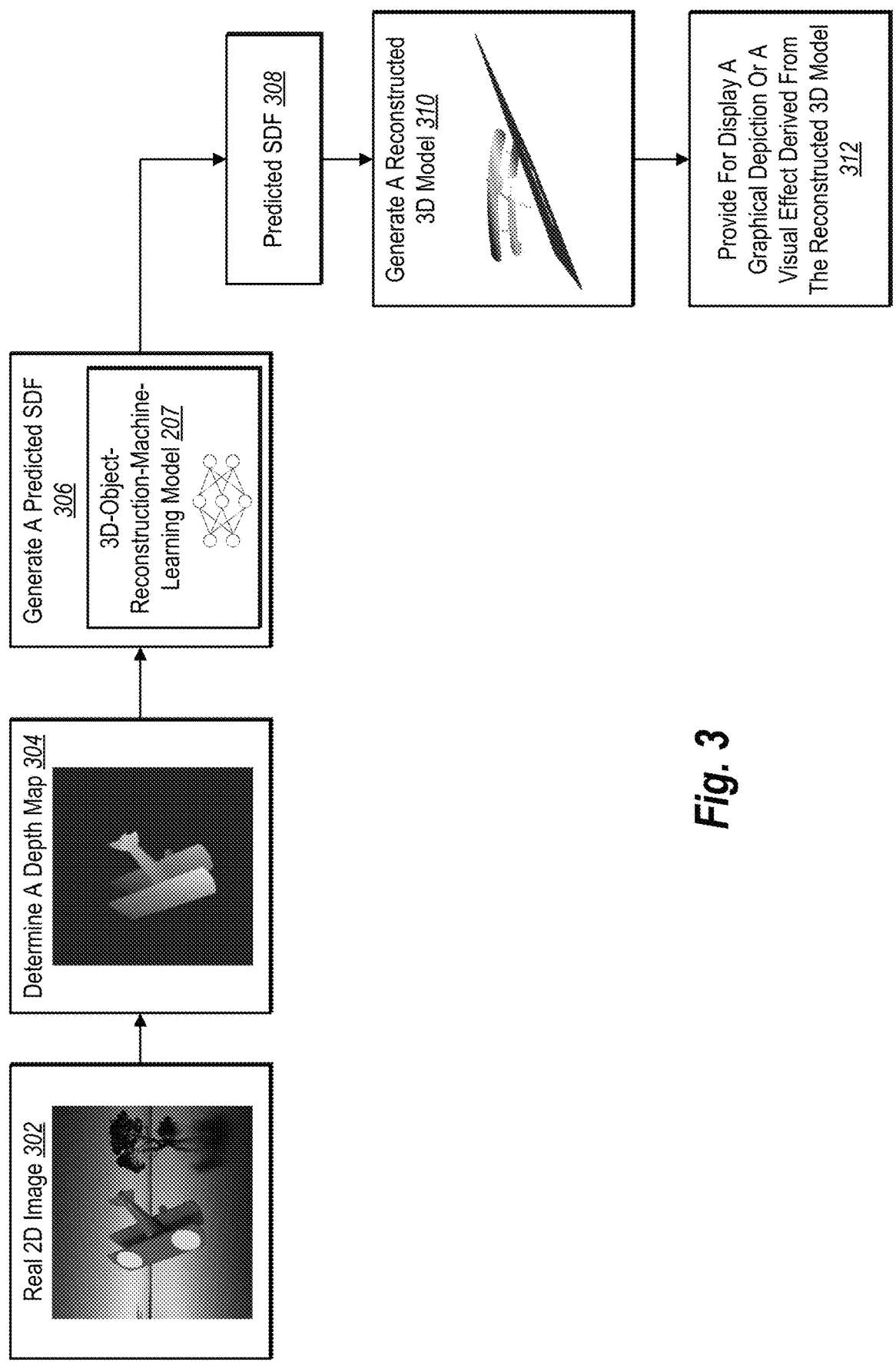
FIG. 3 illustrates a 3D-object-reconstruction system generating a reconstructed 3D model of an object from a real 2D image in accordance with one or more embodiments.

At an act 304 shown in FIG. 3, the 3D-object-reconstruction system 206 determines a depth map for a real 2D image 302. In one or more embodiments, the 3D-object-reconstruction system 206 uses a variety of different methods to determine the depth map. In certain implementations, the 3D-object-reconstruction system 206 uses one or more monocular depth estimation models (e.g., MiDAS Net) trained to generate a depth map from an input image. In other implementations, the 3D-object-reconstruction system 206 generates the depth map using depth information included in or derived from various sources, such as LIDAR images, stereo images, 3D image frames (e.g., from 3D movies), or multi-view images with overlapping captured content.

At an act 306, the 3D-object-reconstruction system 206 generates a predicted SDF 308 of a digital object (e.g., an airplane) portrayed in the real 2D image 302 utilizing the 3D-object-reconstruction-machine-learning model 207. To do so, the 3D-object-reconstruction-machine-learning model 207 leverages the depth map of the real 2D image 302 to learn shape features (e.g., elements of a visible object shape) of the digital object portrayed in the real 2D image 302. For example, the 3D-object-reconstruction-machine-learning model 207 encodes shape features (e.g., a wing shape, a fuselage shape, and a tail shape of an airplane) into a shape feature encoding—also referred to as a predicted latent shape feature vector. In turn, the 3D-object-reconstruction-machine-learning model 207 uses the shape feature encoding based on the depth map to assign predicted SDF values to query points sampled near an object surface of the digital object.

At an act 310, the 3D-object-reconstruction system 206 generates a reconstructed 3D model of the digital object based on the predicted SDF 308. For example, the 3D-object-reconstruction system 206 reconstructs a mesh or a wire-frame model of the digital object based on predicted SDF values corresponding to the predicted SDF 308. The 3D-object-reconstruction system 206 can reconstruct the mesh or the wire-frame model in a variety of different ways, as will be described below in relation to FIG. 5.

At an act 312, the 3D-object-reconstruction system 206 provides for display a graphical depiction of the reconstructed 3D model or a visual effect derived from the reconstructed 3D model. For example, in one or more embodiments, the 3D-object-reconstruction system 206 identifies a user input to modify the real 2D image 302 by repositioning the digital object associated with a shadow. Responsive to the user input, the 3D-object-reconstruction system 206 generates, as a visual effect, a modified shadow that corresponds to the reconstructed 3D model and a modified position of the digital object within the real 2D image. As additional examples, the 3D-object-reconstruction system 206 provides a graphical depiction of the digital object (e.g., a visual representation of an interactive mesh) for display within a graphical user interface of a 3D image editing application. Further, in some embodiments, the 3D-object-reconstruction system 206 provides a graphical depiction of the digital object for display within an additional image other than the real 2D image 302 (e.g., for image relighting).

Figure 4A:
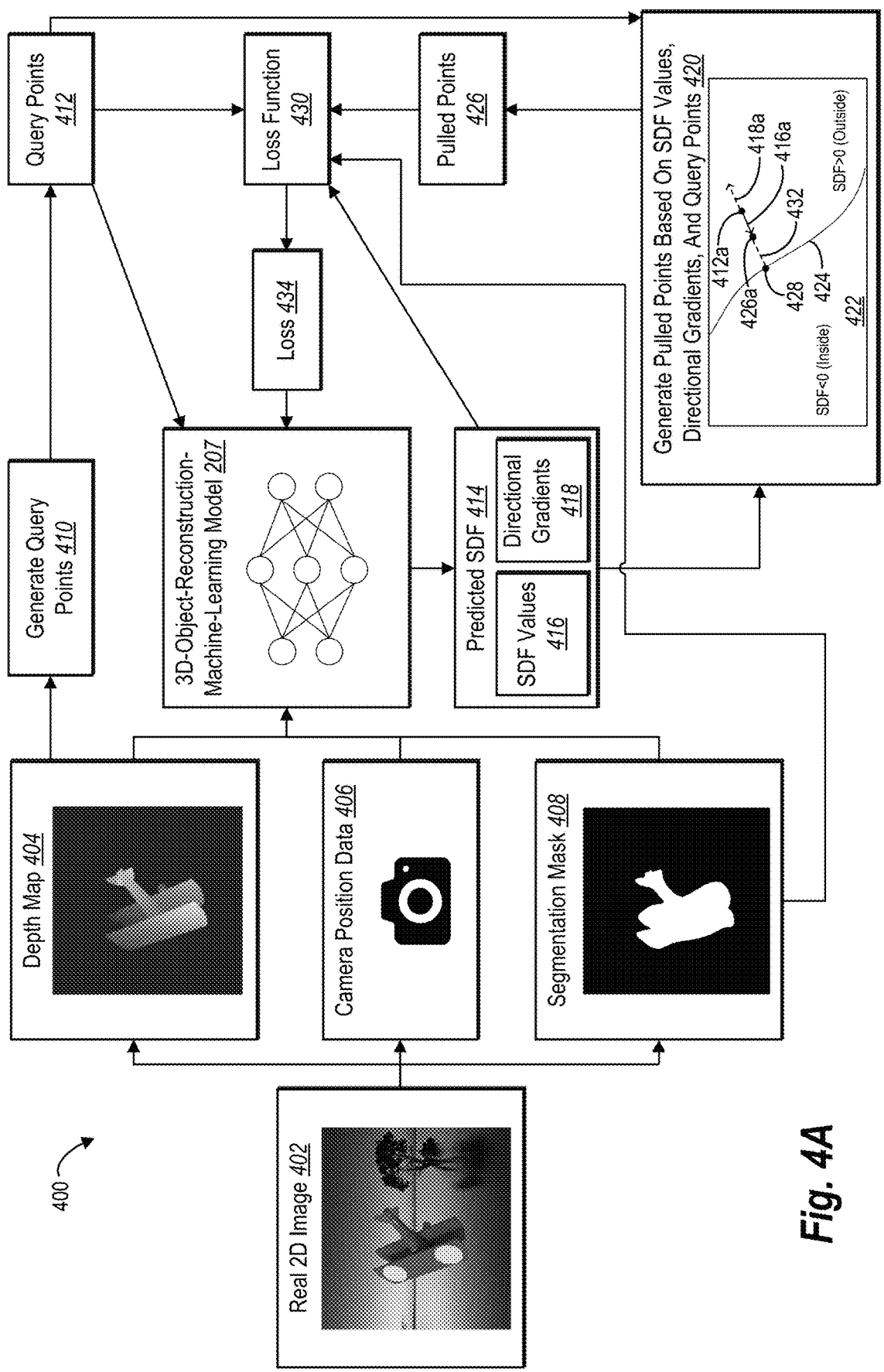
FIGS. 4A-4C illustrate the 3D-object-reconstruction system training a 3D-object-reconstruction-machine-learning model in accordance with one or more embodiments.
Figure 4B:
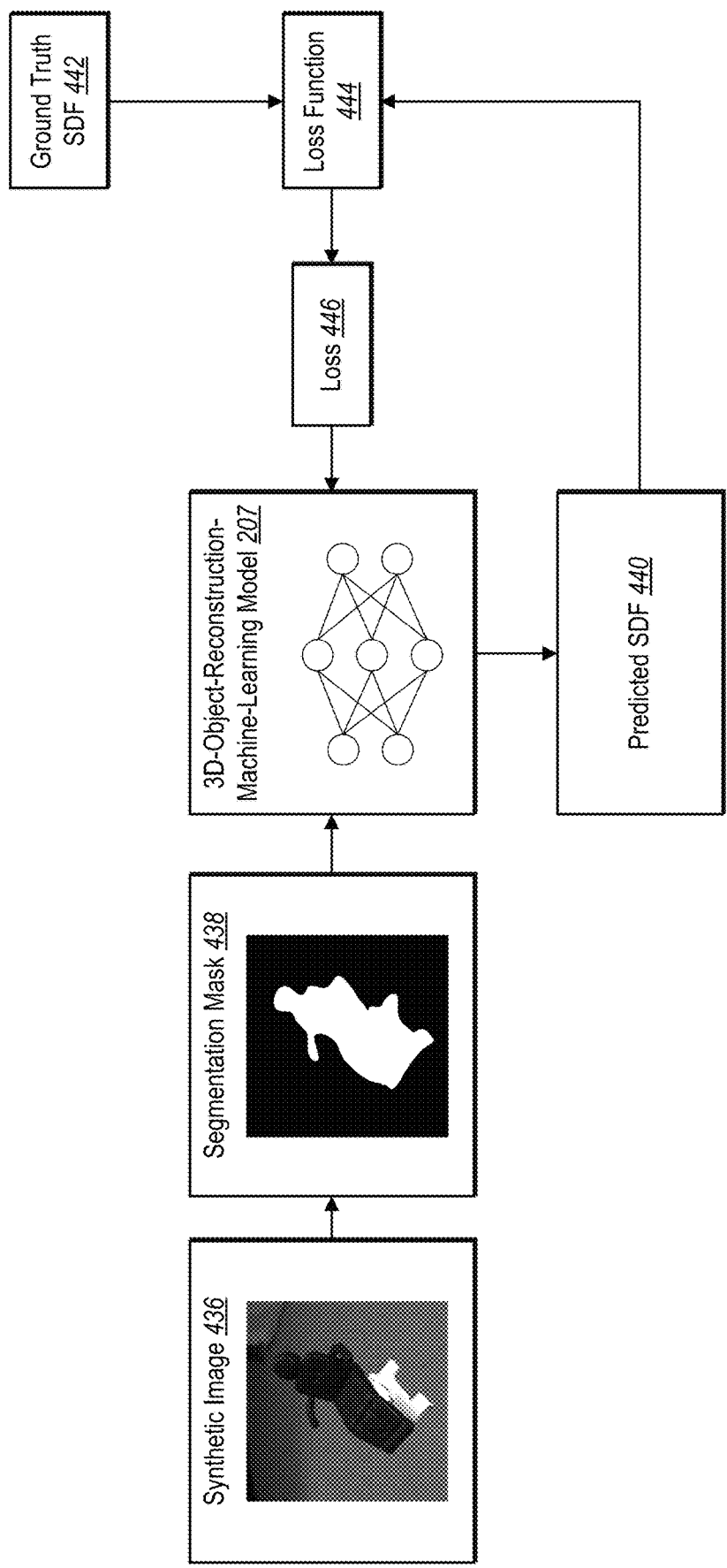
Figure 4C:
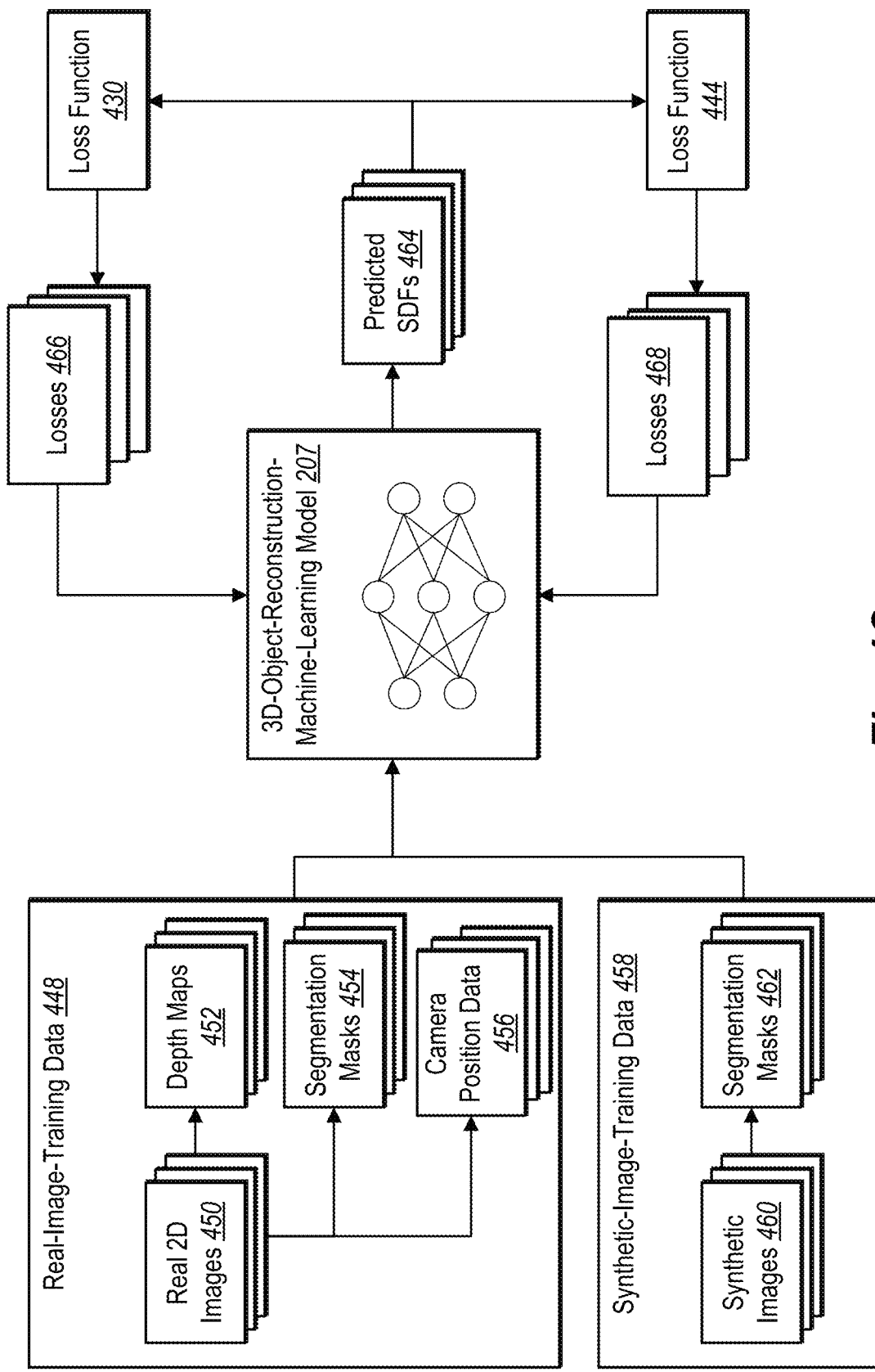

As mentioned above, the 3D-object-reconstruction system 206 can train a 3D-object-reconstruction-machine-learning model using real 2D images with depth information—in addition to synthetic images with ground truth object data. In accordance with one or more such embodiments, FIGS. 4A-4C illustrate process flows for training the 3D-object-reconstruction-machine-learning model 207. FIG. 4A illustrates a real-image-training iteration. FIG. 4B illustrates a synthetic-image-training iteration. FIG. 4C illustrates the 3D-object-reconstruction system 206 training a 3D-object-reconstruction-machine-learning model using both real-image-training data and synthetic-image-training data.

FIG. 4A depicts a real-image-training iteration 400 for the 3D-object-reconstruction-machine-learning model 207. As shown in FIG. 4A, the 3D-object-reconstruction system 206 determines model inputs for a real 2D image 402. In particular, the 3D-object-reconstruction system 206 determines a depth map 404 for the real 2D image 402, camera position data 406, and a segmentation mask 408 from the real 2D image 402. Additionally, the 3D-object-reconstruction system 206 generates query points 412 from the depth map 404. Each of the foregoing model inputs are described in turn.

To generate the depth map 404, the 3D-object-reconstruction system 206 can use a variety of different methods. In certain implementations, the 3D-object-reconstruction system 206 uses one or more deep learning approaches. For example, the 3D-object-reconstruction system 206 uses monocular depth estimation models (e.g., MiDAS Net) trained to generate a depth map from an input image. In so doing, the 3D-object-reconstruction system 206 predicts a depth value (or in relative terms, a disparity value) of each pixel in the real 2D image 402.

In other implementations, the 3D-object-reconstruction system 206 generates the depth map 404 using sensor-based approaches. For example, the 3D-object-reconstruction system 206 extracts or derives depth information based on sensor-based imaging, such as LIDAR or RGB-D cameras that generate images with pixel-level dense depth maps.

Still, in other implementations, the 3D-object-reconstruction system 206 generates the depth map 404 using geometry-based methods. For example, the 3D-object-reconstruction system 206 extracts or derives depth information using a SfM (structure from motion) approach that estimates 3D structures or 3D object data from a series of 2D image sequences. As another example, the 3D-object-reconstruction system 206 uses stereo vision mapping to determine 3D object data by observing a scene from two or more viewpoints.

Additionally, in one or more embodiments, the 3D-object-reconstruction system 206 determines the depth map 404 in a view-centric frame of reference. Although compatible with the object-centric frame of reference, using the view-centric frame of reference for the depth map better trains the 3D-object-reconstruction-machine-learning model 207 to generate reconstructed 3D models for novel object classes. In addition, the view-centric frame of reference for the depth map recovers the viewer-relative pose of the digital object—often, a more appropriate pose for various applications of the reconstructed 3D model.

Based on the depth map 404, at an act 410, the 3D-object-reconstruction system 206 generates the query points 412 as another model input (and loss function input as described below). In one or more embodiments, the query points 412 correspond to points sampled around an object surface (e.g., both inside and outside of a digital object portrayed in the real 2D image 402). Without points in a 3D space being available for the real 2D image 402, the 3D-object-reconstruction system 206 utilizes one or more of a variety of different approaches to generate the query points 412. In particular embodiments, the 3D-object-reconstruction system 206 determines the query points 412 based on disparity values from the depth map 404 and one or more learned parameters. For example, in some embodiments, the 3D-object-reconstruction system 206 generates the query points 412 according to function (1) below:

$$q(x) = \begin{bmatrix} x_0/(sD(x)+t) \\ x_1/(sD(x)+t) \\ f/(sD(x)+t) \end{bmatrix} \quad (1)$$

where a query point $q(x) \in \mathbb{R}^3$; the term $D(x)$ represents a disparity value for a given 2D image coordinate x according to $D: \mathbb{R}^2 \rightarrow \mathbb{R}^+$; the terms $x_0$ and $x_1$ represent pixel coordinates of a pixel for the query point in the 2D image; and parameters $f, s, t \in \mathbb{R}^3$ represent learned parameters of the 3D-object-reconstruction-machine-learning model 207 (or alternatively, optimized parameters for a singular case). In addition to the model inputs comprising the depth map 404 and the query points 412, the 3D-object-reconstruction system 206 further determines the camera position data 406. In one or more embodiments, the 3D-object-reconstruction system 206 uses various different configurations of camera positioning to increase training variation and improve training robustness. For example, the 3D-object-reconstruction system 206 determines various camera parameters to use as the camera position data 406 for a given training iteration—including at least one of tilt or angle, camera rotation, or camera elevation for the real 2D image 402.

As shown in function (1), in the first row of the matrix, the matrix element value is equivalent to the term $x_0$ divided by the sum of the parameter s times $D(x)$ plus the parameter t. In the second row of the matrix, the matrix element value is equivalent to the term $x_1$ divided by the sum of the parameter s times $D(x)$ plus the parameter t. In the third row of the matrix, the matrix element value is equivalent to the parameter f divided by the sum of the parameter s times $D(x)$ plus the parameter t.

In some embodiments, the 3D-object-reconstruction system 206 determines the camera position data 406 associated with the real 2D image 402 (e.g., based on image metadata and/or image processing techniques). In other embodiments, the 3D-object-reconstruction system 206 modifies the camera position data 406 associated with the real 2D image 402. Still, in other embodiments, the 3D-object-reconstruction system 206 determines or uses additional or alternative camera parameters for the camera position data 406 (e.g., for increase training variation).

As another model input and loss function input, the 3D-object-reconstruction system 206 generates the segmentation mask 408 corresponding to a digital object (e.g., the airplane) of the real 2D image 402. In one or more embodiments, the 3D-object-reconstruction system 206 uses an automated approach to generating the segmentation mask 408. For example, the 3D-object-reconstruction system 206 uses a trained segmentation-machine-learning model that includes a salient object segmentation neural network, as described by Pao. Additionally or alternatively, the 3D-object-reconstruction system 206 uses foreground and/or background segmentation algorithms.

In certain implementations, the 3D-object-reconstruction system 206 can use interactive segmenting approaches. To illustrate, in one or more embodiments, the 3D-object-reconstruction system 206 detects a user interaction with one or more digital selection tools that, when applied, indicate pixels or groups of pixels of the real 2D image 402 corresponding to a digital object. For instance, the 3D-object-reconstruction system 206 identifies the digital object based on identifying an approximate outline of the digital object (e.g., via a digital lasso selection tool). In another instance, the 3D-object-reconstruction system 206 identifies the digital object based on identifying one or more user indicators (e.g., positive clicks, negative clicks, boundary indicators) that indicate portion(s) of the object as corresponding to (and/or not corresponding to) the digital object.

As further shown in FIG. 4A, the 3D-object-reconstruction system 206 generates a predicted SDF 414 based on each of the model inputs—namely the depth map 404, the camera position data 406, the segmentation mask 408, and the query points 412. In particular embodiments, the 3D-object-reconstruction system 206 uses neural network layers (e.g., convolutional layers, fully connected layers) that together can predict SDF values based on the model inputs.

In some embodiments, the 3D-object-reconstruction system 206 generates SDF values as described in Thai et al. For example, the 3D-object-reconstruction system 206 uses the 3D-object-reconstruction-machine-learning model 207 to encode the depth map 404, the segmentation mask 408, and/or the camera position data 406 into a shape feature encoding using the ResNet18 architecture of neural network layers. Subsequently, fully connected layers of the 3D-object-reconstruction-machine-learning model 207 generate parameters based on the shape feature encoding. For example, as described in Thai et al., the 3D-object-reconstruction-machine-learning model 207 similarly uses fully connected layers to weight (or otherwise process) the query points 412. Then, the 3D-object-reconstruction-machine-learning model 207 combines the parameters and the weighted query points to generate conditional batch norm values. In turn, the 3D-object-reconstruction-machine-learning model 207 assigns SDF values 416 and directional gradients 418 to the query points 412 based on the conditional batch norm values.

Upon generating the predicted SDF 414, the 3D-object-reconstruction system 206 evaluates the predicted SDF 414 by using a loss function 430. In particular, the 3D-object-reconstruction system 206 can use depth-based supervision by modifying the neural-pull approach as described in Ma et al., *Neural-Pull: Learning Signed Distance Functions From Point Clouds By Learning to Pull Space Onto Surfaces*, In Proceedings of the 38th International Conference on Machine Learning, PMLR 139, 2021 (hereinafter "Ma et al."), archived at arxiv.org/pdf/2011.13495.pdf, the contents of which are expressly incorporated herein by reference.

To implement a depth-based supervision, for example, at an act 420, the 3D-object-reconstruction system 206 generates pulled points 426 based on the SDF values 416, the directional gradients 418, and the query points 412. The graphic shown at the act 420 in FIG. 4A is illustrative. For example, in a spatial representation 422, the 3D-object-reconstruction system 206 represents a space inside and outside of the digital object (e.g., the airplane) relative to an object surface 424. Within the spatial representation 422, the 3D-object-reconstruction system 206 pulls (e.g., moves or translates) the query point 412a towards a surface depth point 428 on the object surface 424.

In particular, the 3D-object-reconstruction system 206 pulls the query point 412a to a pulled point 426a. The distance of the pull from the query point 412a to the pulled point 426a corresponds to an SDF value 416a assigned to the query point 412a. In addition, the direction of the pull from the query point 412a to the pulled point 426a corresponds to a directional gradient 418a assigned to the query point 412a. Specifically, the 3D-object-reconstruction system 206 pulls the query point 412a to the pulled point 426a in a direction opposite of the directional gradient 418a because the query point 412a is positioned outside of or external to the digital object (e.g., right of the object surface 424). Alternatively, for query points positioned inside of the digital object, the 3D-object-reconstruction system 206 pulls the inside-positioned query points in a same direction as the corresponding directional gradients.

The remaining distance or gap between the pulled point 426a and the surface depth point 428 represent a depth differential 432. The smaller the depth differential 432 is, the more accurate the SDF value 416a is. For example, in one or more embodiments, the 3D-object-reconstruction system 206 uses the loss function 430 to determines a loss 434. The loss 434 comprises quantifiable data regarding the depth differential 432. Moreover, the 3D-object-reconstruction system 206 uses the loss 434 to adjust various parameters/hyperparameters to improve the quality/accuracy of predicted SDFs in subsequent training iterations—by narrowing the depth differential 432 based on additional predicted SDFs corresponding to additional real 2D images.

However, unlike Ma et al., the 3D-object-reconstruction system 206 uses a first-of-its-kind loss function to rely on disparity information for real images to supervise training the 3D-object-reconstruction-machine-learning model 207. This disparity information for real images can be obtained in a variety of ways (e.g., via a monocular depth estimation model as described above). That is, unlike Ma et al., the 3D-object-reconstruction system 206 uses the loss function 430 that covers the real 2D image training scenario in which points in $\mathbb{R}^3$ are not available. For instance, the 3D-object-reconstruction system 206 can employ parameters representing the segmentation mask 408, the query points 412, the predicted SDF 414, and the pulled points 426 in the loss function 430—thereby leveraging disparity information that is available (or readily attainable). To do so, in certain implementations, the 3D-object-reconstruction system 206 represents the loss function 430 according to function (2) below:

$$\underset{\theta,f,s,t}{\operatorname{argmin}} \int_{[0,1]^2} M(x) \left\| \epsilon_i - f_\theta(\hat{q}_i(x)) \frac{\nabla f_\theta(\hat{q}_i(x))}{\|\nabla f_\theta(\hat{q}_i(x))\|_2} \right\|_2 dx \quad (2)$$

where M(x) represents a binary value according to M: $\mathbb{R}^2 \to \{0,1\}$ for an image coordinate according to the segmentation mask 408. The binary value (0 or 1) indicates whether a given pixel corresponds to the digital object in the real 2D image 402. Additionally, the $\|\cdot\|_2$ represents the L2 norm or Euclidean length of the inside vector.

As further indicated by function (2), the term $f_\theta(\cdot)$ represents the SDF approximation (e.g., the SDF values 416) according to $f_\theta: \mathbb{R}^3 \to \mathbb{R}$. In addition, the term $q_i(x)$ represents the query points 412 according to function (1). As also shown by function (2), the $\hat{\bullet}$ represents a perturbation operator ($\hat{\bullet}: \mathbb{R}^3 \to \mathbb{R}^3$) that adds a noise metric to the input—in this case to the term $q_i(x)$. The noise metric includes an amount of noise perturbation $\epsilon_i$ approximately equal to covariance elements $\sigma^2$ of an isotropic Gaussian function $\mathcal{N}(0, \sigma I)$, where I represents the number of query points 412. In addition, the term $$\frac{\nabla f_\theta(\hat{q}_i(x))}{\|\nabla f_\theta(\hat{q}_i(x))\|}$$

represents the directional gradients 418.

Thus, according to function (2), the 3D-object-reconstruction system 206 determines the closed integral of M(x) multiplied by the L2 norm of the noise perturbation $\epsilon_i$ subtracted by the SDF approximation of a noise-perturbed query point $f_\theta(\hat{q}_i(x))$ times the directional gradient $$\frac{\nabla f_\theta(\hat{q}_i(x))}{\|\nabla f_\theta(\hat{q}_i(x))\|}.$$

In addition, function (2) shows that the 3D-object-reconstruction system 206 minimizes the foregoing arguments with respect to parameters θ, f, s, t.

As indicated above, in some embodiments, the 3D-object-reconstruction-machine-learning model 207 constitutes a DISN or an OccNet. In some such embodiments, in the alternative to function (2), the loss function 430 includes, but is not limited to, a regression loss function (e.g., a mean square error function, a quadratic loss function, an L2 loss function, a mean absolute error/L1 loss function, mean bias error). Additionally, or alternatively, the loss function 430 includes a classification loss function (e.g., a hinge loss/multi-class SVM loss function, cross entropy loss/negative log likelihood function).

As indicated by the arrow pointing from the loss 434 to the 3D-object-reconstruction-machine-learning model 207, over a plurality of training iterations, the 3D-object-reconstruction system 206 can determine a loss using the loss function 430 and to adjust parameters of the 3D-object-reconstruction-machine-learning model 207 to reduce or minimize a depth differential between pulled points and an object surface in subsequent training iterations. That is, over training iterations, the 3D-object-reconstruction system 206 uses a loss from the loss function 430 to incrementally adjust parameters of the 3D-object-reconstruction-machine-learning model 207 to improve predicted SDFs.

As just described for the real-image-training iteration 400 of FIG. 4A, the 3D-object-reconstruction system 206 can flexibly train the 3D-object-reconstruction-machine-learning model using real 2D images without ground truth SDF values. In contrast to a real-image-training iteration, FIG. 4B depicts the 3D-object-reconstruction system 206 training the 3D-object-reconstruction-machine-learning model 207 using training data from a synthetic image.

As shown in FIG. 4B, the 3D-object-reconstruction system 206 generates a segmentation mask 438 corresponding to a synthetic image 436 (e.g., from a synthetic image dataset). The 3D-object-reconstruction system 206 generates the segmentation mask 438 in a same or similar manner as described above for the segmentation mask 408 of FIG. 4A. For example, the 3D-object-reconstruction system 206 uses a trained segmentation-machine-learning model that includes a salient object segmentation neural network as described by Pao. Additionally or alternatively, the 3D-object-reconstruction system 206 uses foreground and/or background segmentation algorithms. In other embodiments, the 3D-object-reconstruction system 206 generates the segmentation mask 438 by utilizing interactive segmenting approaches.

Based on the segmentation mask 438, the 3D-object-reconstruction-machine-learning model 207 generates a predicted SDF 440. For example, as described in Thai et al., the 3D-object-reconstruction system 206 uses the 3D-object-reconstruction-machine-learning model 207 to encode the segmentation mask 438 into a shape feature encoding and to generate corresponding parameters utilizing fully connected layers. In addition, the 3D-object-reconstruction-machine-learning model 207 uses fully connected layers to weight (or otherwise process) an additional set of query points around the object surface of the digital object depicted in the synthetic image 436. Then, the 3D-object-reconstruction-machine-learning model 207 combines the parameters and the weighted set of additional query points to generate conditional batch norm values. In turn, the 3D-object-reconstruction-machine-learning model 207 assigns an additional set of SDF values and directional gradients to the additional set of query points based on the conditional batch norm values.

Unique to synthetic images, however, the points in $\mathbb{R}^3$ are known. More particularly, synthetic images from synthetic datasets are associated with ground truth object data (e.g., 3D object data, such as a mesh) from which ground truth SDF values can be derived. Accordingly, the 3D-object-reconstruction system 206 can use a different loss function (e.g., without depth supervision) that is specific to synthetic images to evaluate the predicted SDF 440. For example, in particular embodiments, the 3D-object-reconstruction system 206 uses a loss function 444 that compares a ground truth SDF 442 and the predicted SDF 440 to generate a loss 446.

In one or more embodiments, the loss function 444 compares the ground truth SDF 442 and the predicted SDF 440 (e.g., by determining a quantifiable difference between the ground truth SDF 442 and the predicted SDF 440). In particular embodiments, the 3D-object-reconstruction system 206 represents the loss function 444 according to function (3) below:

$$\operatorname*{argmin}_{\theta} \frac{1}{|P|} \sum_{p_i \in P} \left\| p_i - \left( \hat{p}_i - f_\theta(\hat{p}_i) \frac{\nabla f_\theta(\hat{p}_i)}{\|\nabla f_\theta(\hat{p}_i)\|} \right) \right\|_2 \quad (3)$$

where $p_1$ represents surface points $p \in \mathbb{R}^3$ corresponding to an object surface of a digital object; the term $\hat{p}_i$ represents query points perturbed from the surface points $p_i$; the term $f_\theta(\cdot)$ represents the SDF approximations (e.g., the SDF values) according to $f_\theta: \mathbb{R}^3 \to \mathbb{R}$; the term $$\frac{\nabla f_\theta(\hat{p}_i)}{\|\nabla f_\theta(\hat{p}_i)\|}$$

represents the directional gradients for the query points; and the parameter $\theta$ comprises a learned parameter such that the zero-level set of $f_\theta$ approximately includes a set of points $\{p_i\}_{i=1}^{i=N}$.

Thus, according to function (3), the 3D-object-reconstruction system 206 determines the average of the L2 norm or Euclidean distance between the surface points $p_i$ subtracted by the difference of the query point and the SDF approximation for the query point $f_\theta(\hat{p}_i)$ times the directional gradient for the query point $$\frac{\nabla f_\theta(\hat{p}_i)}{\|\nabla f_\theta(\hat{p}_i)\|}.$$

Put differently, the 3D-object-reconstruction system 206 determines the mean squared error between the predicted SDF value at a point on the one hand, and the ground truth SDF value at the point on the other hand. Accordingly, the expression inside the summation of function (3) may be replaced by this mean squared error as $|f_\theta(\hat{p}_i) - SDF(\hat{p}_i)|^2$. In addition, function (3) shows that the 3D-object-reconstruction system 206 minimizes the foregoing arguments with respect to the parameter $\theta$.

Based on the loss 446 from the loss function 444, the 3D-object-reconstruction system 206 updates one or more learned parameters of the 3D-object-reconstruction-machine-learning model 207. For example, the 3D-object-reconstruction system 206 uses the loss 446 to adjust various parameters/hyperparameters to improve the quality/accuracy of predicted SDFs in subsequent training iterations—by narrowing the difference between predicted SDFs and ground truth SDFs corresponding to additional synthetic images.

As indicated above, in some embodiments, the 3D-object-reconstruction-machine-learning model 207 constitutes a DISN or an OccNet. In some such embodiments, in the alternative to function (3), the loss function 444 includes a regression loss function or a classification loss function (as described above for the loss function 430).

In view of FIGS. 4A-4B, it will be appreciated that the 3D-object-reconstruction system 206 can train the 3D-object-reconstruction-machine-learning model 207 in a variety of different ways based on both synthetic images and real 2D images. In accordance with one or more such embodiments, FIG. 4C illustrates the 3D-object-reconstruction system 206 implements both real-image-training iterations and synthetic-image-training iterations as respectively described above.

For example, in some embodiments, the 3D-object-reconstruction system 206 trains the 3D-object-reconstruction-machine-learning model 207 in a batch-based fashion that uses batches of training data comprising real 2D images 450 and synthetic images 460. In certain embodiments, the 3D-object-reconstruction system 206 separates the training iterations for the different types of images because real 2D images do not have ground truth SDF values and synthetic images do. For instance, in a first set of training iterations, the 3D-object-reconstruction system 206 trains the 3D-object-reconstruction-machine-learning model 207 based exclusively on real-image-training data 448. As indicated, the real-image-training data 448 includes the real 2D images 450 and the corresponding information of depth maps 452, segmentation masks 454, and camera position data 456. The depth maps 452, the segmentation masks 454, and the camera position data 456 are the same as (or similar to) training data represented by the depth map 404, the segmentation mask 408, and the camera position data 406 respectively described above in relation to FIG. 4A.

Based on the real-image-training data 448, in various training iterations, the 3D-object-reconstruction-machine-learning model 207 generates a first set of predicted SDFs 464 for evaluation via the loss function 430. Indeed, as described above in relation to FIG. 4A, the 3D-object-reconstruction system 206 generates each loss from the losses 466 in various training by utilizing the loss function 430 that implements depth supervision according to a neural-pull based approach. Based on each loss, the 3D-object-reconstruction system 206 updates one or more learned parameters of the 3D-object-reconstruction-machine-learning model 207.

Subsequently, in a second set of training iterations, the 3D-object-reconstruction system 206 trains the 3D-object-reconstruction-machine-learning model 207 based on synthetic-image-training data 458. As indicated, the synthetic-image-training data 458 includes the synthetic images 460 and corresponding segmentation masks 462. The segmentation masks 462 are the same as (or similar to) the segmentation mask 438 described above in relation to FIG. 4B.

Based on the synthetic-image-training data 458, in various training iterations, the 3D-object-reconstruction system 206 generates a second set of predicted SDFs 464 for evaluation via the loss function 444. For example, as described above in relation to FIG. 4B, the 3D-object-reconstruction system 206 generates each loss from the losses 468 by iteratively comparing the second set of predicted SDFs 464 and corresponding ground truth SDF values (not shown) according to the loss function 444. In turn, the 3D-object-reconstruction system 206 updates one or more learned parameters of the 3D-object-reconstruction-machine-learning model 207 based on each loss.

In other cases, however, the 3D-object-reconstruction system 206 can train the 3D-object-reconstruction-machine-learning model 207 using parallel training flows (e.g., simultaneous or multitask training based on the real 2D images 450 and the synthetic images 460). In these or other embodiments, the 3D-object-reconstruction system 206 performs a unified training flow by treating synthetic images as real 2D images. That is, in one or more embodiments, the 3D-object-reconstruction system 206 trains the 3D-object-reconstruction-machine-learning model 207 based on the real 2D images 450 and the synthetic images 460 using exclusively the loss function 430 for implementing depth-based supervision.

Additionally, albeit not illustrated in FIGS. 4A-4C, the 3D-object-reconstruction-machine-learning model 207 can include one or more network layers for predicting a depth map and/or a segmentation mask—in addition to a predicted SDF. Indeed, rather than utilizing separately trained models, the 3D-object-reconstruction system 206 can additionally train a sub-network or sub-model of the 3D-object-reconstruction-machine-learning model 207 to determine a depth map and another sub-network or sub-model of the 3D-object-reconstruction-machine-learning model 207 to determine a segmentation mask (e.g., in an end-to-end manner) for generating a predicted SDF. For instance, the 3D-object-reconstruction system 206 can train a depth neural network (e.g., MiDAS Net) and a salient object segmentation neural network (e.g., as described in Pao) as sub-models together with the 3D-object-reconstruction-machine-learning model 207.

As mentioned above, the 3D-object-reconstruction system 206 can flexibly utilize depth maps to generate a reconstructed 3D model of a digital object. Upon generating the reconstructed 3D model, the 3D-object-reconstruction system 206 can provide the reconstructed 3D model for display in various ways depending on the desired application. In accordance with one or more such embodiments, FIG. 5 illustrates the 3D-object-reconstruction system 206 providing a reconstructed 3D model for display.

Figure 5:
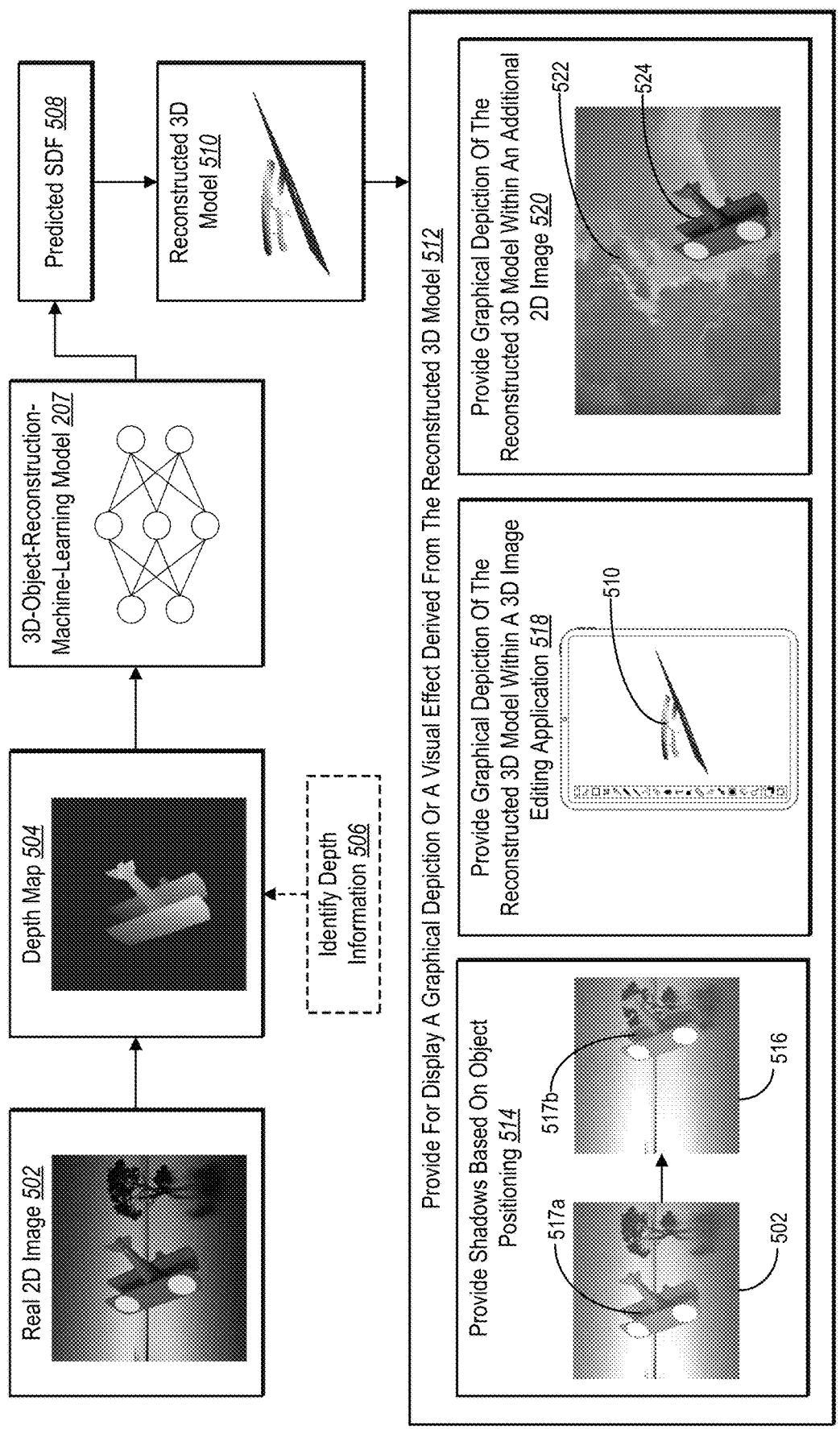
FIG. 5 illustrates the 3D-object-reconstruction system generating a reconstructed 3D model of an object from a real 2D image and providing the reconstructed 3D model for display in accordance with one or more embodiments.

As shown in FIG. 5, the 3D-object-reconstruction system 206 determines a depth map 504 for a real 2D image 502. The 3D-object-reconstruction system 206 utilizes one or more different approaches to generating the depth map 504. In particular embodiments, the 3D-object-reconstruction system 206 uses one or more deep learning approaches, such as a monocular depth estimation model (e.g., MiDAS Net) trained to generate a depth map from an input image.

Additionally or alternatively, the 3D-object-reconstruction system 206 determines the depth map 504 by performing an optional act 506 to identify depth information. For example, in some embodiments, the 3D-object-reconstruction system 206 extracts or derives depth information using sensor-based imaging, such as LIDAR or RGB-D cameras that generate images with pixel-level dense depth maps. As another example, the 3D-object-reconstruction system 206 identifies depth information to generate the depth map 504 by using geometry-based methods (e.g., SfM methods or stereo images).

From the depth map 504, the 3D-object-reconstruction system 206 generates a predicted SDF 508. For example, as described above, the 3D-object-reconstruction system 206 utilizes the 3D-object-reconstruction-machine-learning model 207 to learn shape features from the depth map 504. Specifically, the 3D-object-reconstruction-machine-learning model 207 uses a shape feature encoding to generate parameters at fully connected layers. Additionally, the 3D-object-reconstruction-machine-learning model 207 uses additional fully connected layers to weight a set of query points sampled around an object surface of the object depicted in the real 2D image 502. Subsequently, the 3D-object-reconstruction-machine-learning model 207 combines the weighted query points and the parameters to generate conditional batch norm values. Based on the conditional batch norm values, the 3D-object-reconstruction-machine-learning model 207 assigns SDF values to each of the query points.

Utilizing the predicted SDF 508, the 3D-object-reconstruction system 206 generates a reconstructed 3D model 510. For example, the 3D-object-reconstruction system 206 reconstructs a mesh of the digital object based on predicted SDF values corresponding to the predicted SDF 508. To illustrate, in one or more embodiments, the 3D-object-reconstruction system 206 uses the marching cubes algorithm to generate the mesh (e.g., as described by Lorensen et al., *A High Resolution 3D Surface Construction Algorithm*, In Computer Graphics, 21(4):163-169, 1987, the contents of which are expressly incorporated herein by reference). However, it will be appreciated that other suitable meshing algorithms can also generate a mesh of a digital object based on the predicted SDF 508. For example, the 3D-object-reconstruction system 206 can implement the grid-based method, medial axis method, plastering method, whisker weaving method, paving method, mapping mesh method, quadtree mesh method, Delaunay triangulation method, advancing front method, spatial decomposition method, sphere packing method, etc.

At an act 512, the 3D-object-reconstruction system 206 provides for display a graphical depiction of or a visual effect derived from the reconstructed 3D model 510. To do so, the 3D-object-reconstruction system 206 performs one or more of acts 514, 518, or 520. Indeed, in some embodiments, the 3D-object-reconstruction system 206 performs only one of the acts 514, 518, or 520. Alternatively, the 3D-object-reconstruction system 206 may perform on or more combinations of the acts 514, 518, or 520.

At the act 514, the 3D-object-reconstruction system 206 provides shadows based on object positioning. For example, in the real 2D image 502, the 3D-object-reconstruction system 206 determines pixels and/or color grading that resemble an original shadow 517a. Subsequently, the 3D-object-reconstruction system 206 identifies a user input to move the digital object within the real 2D image 502. Specifically, as shown in the modified image 516, the user input causes the digital object (e.g., the airplane) to translate in a lateral, left-to-right direction to a modified position. Based on the user input, the 3D-object-reconstruction system 206 uses the reconstructed 3D model 510 to determine pixels and/or color grading that modify the original shadow 517a on the lower wing of the airplane. Indeed, as shown in the modified image 516, the 3D-object-reconstruction system 206 determines pixels and/or color grading that resemble a modified shadow 517b with increased size over the lower airplane wing to correspond to the modified position of the digital object.

Even though the reconstructed 3D model 510 is not illustrated in the modified image 516, the 3D-object-reconstruction system 206 displays a visual effect (e.g., a shadow modification) derived from the reconstructed 3D model 510. For instance, the 3D-object-reconstruction system 206 uses the reconstructed 3D model 510 hidden from view to determine how the original shadow 517a maps to the modified shadow 517b on the digital object. To illustrate, in certain embodiments, the 3D-object-reconstruction system 206 uses positional movement of the underlying reconstructed 3D model 510 in relation to a light source in the real 2D image 502 to correspondingly edit pixels of the real 2D image 502 to depict the modified shadow 517b.

In other embodiments not shown, the 3D-object-reconstruction system 206 generates pixels for a graphical depiction of the reconstructed 3D model 510 for display in the modified image 516. Additionally, in some embodiments, the 3D-object-reconstruction system 206 performs other types of visual effects (e.g., surface reflectance) and/or different types of object repositioning (e.g., object rotation).

At the act 518, the 3D-object-reconstruction system 206 provides a graphical depiction of the reconstructed 3D model 510 within a 3D image editing application. For example, the 3D-object-reconstruction system 206 transmits data representing the reconstructed 3D model 510 to a client device (e.g., via a 3D image editing application). Within the 3D image editing application, the client device can receive user inputs to correspondingly view, edit, share, save, or otherwise interact with the reconstructed 3D model 510. To illustrate, the client device may receive myriad different user inputs with respect to the reconstructed 3D model 510, such as applying color modifications, applying filters or masks, cropping or adding certain features, changing an object pose, inserting text onto an object surface, etc. Additionally, or alternatively, the 3D-object-reconstruction system 206 can generate a graphical object based on the reconstructed 3D model 510, such as a fleshed-out depiction of the object upon which the reconstructed 3D model 510 is based (e.g., a plane, a person, a chair).

At the act 520, the 3D-object-reconstruction system 206 generates a graphical object 524 based on the reconstructed 3D model 510 within an additional 2D image 522 that differs from the real 2D image 502. For example, at the act 520, the 3D-object-reconstruction system 206 transfers the graphical object 524 based on the reconstructed 3D model 510 to the additional 2D image 522 and adjusts pixels and/or color grading for the additional 2D image 522 to relight objects to reflect the addition of the graphical object 524. Within the additional 2D image 522, the 3D-object-reconstruction system 206 (or a 3D image editing application) can perform one or more of the various edits discussed above at the act 518.

It will be appreciated that the act 520 comprises myriad different applications than shown in FIG. 5. As an example scenario, image relighting according to the act 520 may be advantageous for an individual who missed a family or friend event but would still like to be included in pictures corresponding to the family or friend event. In this scenario, the 3D-object-reconstruction system 206 can retarget the individual (e.g., a digital object portrayed in a digital image) to a family-event-digital image portraying the individual at the family event.

Figure 6:
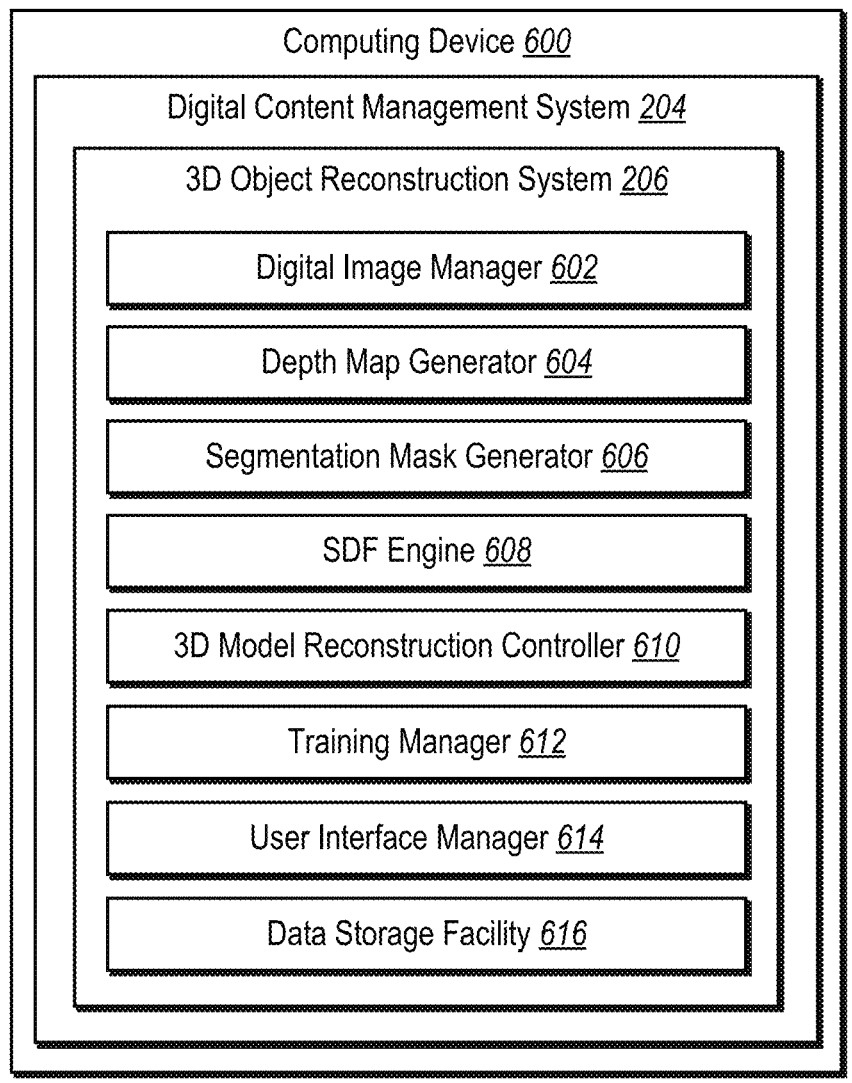
FIG. 6 illustrates a schematic diagram of a computing device implementing a 3D-object-reconstruction system in accordance with one or more embodiments.

Turning to FIG. 6, additional detail will now be provided regarding various components and capabilities of the 3D-object-reconstruction system 206. In particular, FIG. 6 illustrates an example schematic diagram of a computing device 600 (e.g., the server(s) 202, the client device 208, and/or the third-party server 212) implementing the 3D-object-reconstruction system 206 in accordance with one or more embodiments of the present disclosure. As shown, the 3D-object-reconstruction system 206 is implemented by the digital content management system 204. Also illustrated, the 3D-object-reconstruction system 206 includes a digital image manager 602, a depth map generator 604, a segmentation mask generator 606, an SDF engine 608, a 3D model reconstruction controller 610, a training manager 612, a user interface manager 614, and a data storage facility 616.

The digital image manager 602 generates, stores, analyzes, and/or retrieves digital images (as described in relation to the foregoing figures). In particular embodiments, the digital image manager 602 stores and/or accesses synthetic images comprising 3D object data (e.g., from one or more synthetic image databases). Additionally, in one or more embodiments, the digital image manager 602 stores and/or accesses real 2D images.

The depth map generator 604 generates, stores, and/or retrieves depth maps (as described in relation to the foregoing figures). In particular embodiments, the depth map generator 604 generates a depth map based on real 2D images from the digital image manager 602. For example, the depth map generator 604 generates depth maps for real 2D images using one or more monocular depth estimation models (e.g., a MiDAS network).

The segmentation mask generator 606 generates, stores, and/or retrieves a segmentation mask (as described in relation to the foregoing figures). In particular training embodiments, the segmentation mask generator 606 generates a segmentation mask for a real 2D image or a synthetic image utilizing one or more segmentation models trained to generate a segmentation mask from an input image. For example, the segmentation mask generator 606 utilizes a salient object segmentation neural network as described in Pao to generate a segmentation mask targeting a digital object portrayed in a digital image.

The SDF engine 608 generates predicted SDFs (as described in relation to the foregoing figures). In particular embodiments, the SDF engine 608 generates predicted SDFs corresponding to a digital object portrayed in a digital image from the digital image manager 602. For example, the SDF engine 608 comprises a 3D-object-reconstruction-machine-learning model that uses a depth map from the depth map generator 604 to generate a predicted SDF for a digital object.

The 3D model reconstruction controller 610 uses a predicted SDF from the SDF engine 608 to generate a reconstructed 3D model of a digital object portrayed in a digital image (as described in relation to the foregoing figures). In particular embodiments, the 3D model reconstruction controller 610 reconstructs the mesh of the digital object based on the predicted SDF. For example, the 3D model reconstruction controller 610 uses the marching cubes algorithm to generate a mesh of the digital object from the predicted SDF.

The training manager 612 trains the SDF engine 608 (as described in relation to the foregoing figures). In particular embodiments, the training manager 612 trains the 3D-object-reconstruction-machine-learning model of the SDF engine 608 utilizing real 2D images and synthetic images. For example, the training manager 612 performs a first training iteration to modify one or more parameters of the 3D-object-reconstruction-machine-learning model based on a depth differential. In addition, the training manager 612 performs a second training iteration to modify the one or more parameters of the 3D-object-reconstruction-machine-learning model based on a difference between a predicted signed distance function value and a ground truth signed distance value.

In one or more embodiments, the user interface manager 614 provides, manages, and/or controls a graphical user interface (or simply "user interface"). In particular embodiments, the user interface manager 614 generates and displays a user interface by way of a display screen composed of a plurality of graphical components, objects, and/or elements that allow a user to perform a function. For example, the user interface manager 614 receives user inputs from a user, such as a click/tap to view, edit, segment, interact with, or transmit a digital image. Additionally, in one or more embodiments, the user interface manager 614 presents a variety of types of information, including text, rendered reconstructed 3D models, or other information for presentation in a user interface.

The data storage facility 616 maintains data for the 3D-object-reconstruction system 206. The data storage facility 616 (e.g., via one or more memory devices) maintains data of any type, size, or kind, as necessary to perform the functions of the 3D-object-reconstruction system 206. For example, the data storage facility 616 stores real 2D images, synthetic images, and/or a 3D-object-reconstruction-machine-learning model.

Each of the components of the computing device 600 can include software, hardware, or both. For example, the components of the computing device 600 can include one or more instructions stored on a computer-readable storage medium and executable by processors of one or more computing devices, such as a client device or server device. When executed by the one or more processors, the computer-executable instructions of the 3D-object-reconstruction system 206 can cause the computing device(s) (e.g., the computing device 600) to perform the methods described herein. Alternatively, the components of the computing device 600 can include hardware, such as a special-purpose processing device to perform a certain function or group of functions. Alternatively, the components of the computing device 600 can include a combination of computer-executable instructions and hardware.

Furthermore, the components of the computing device 600 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 600 may be implemented as a stand-alone application, such as a desktop or mobile application. Furthermore, the components of the computing device 600 may be implemented as one or more web-based applications hosted on a remote server.

The components of the computing device 600 may also be implemented in a suite of mobile device applications or "apps." To illustrate, the components of the computing device 600 may be implemented in an application, including but not limited to, PHOTOSHOP®, ADOBE® PREMIERE®, LIGHTROOM®, or ILLUSTRATOR®. Product names, including "ADOBE" and any other portion of one or more of the foregoing product names, may include registered trademarks or trademarks of Adobe Inc. in the United States and/or other countries.

Figure 7A:
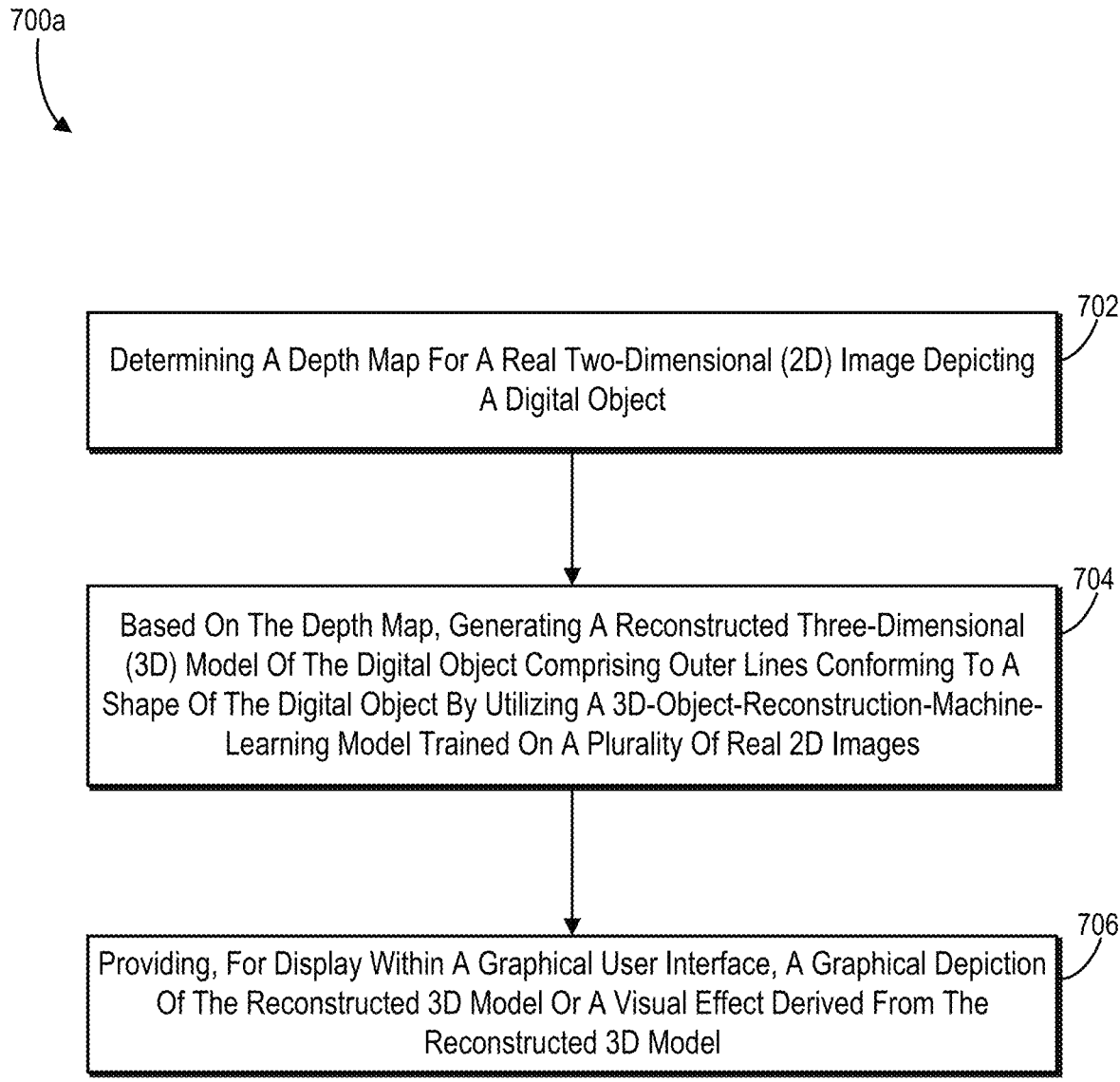
FIG. 7A illustrates a flowchart of a series of acts for generating a reconstructed 3D model in accordance with one or more embodiments.

FIGS. 1-6, the corresponding text, and the examples provide several different systems, methods, techniques, components, and/or devices of the 3D-object-reconstruction system 206 in accordance with one or more embodiments. In addition to the above description, one or more embodiments can also be described in terms of flowcharts including acts for accomplishing a particular result. For example, FIG. 7A illustrates a flowchart of a series of acts 700a for generating a reconstructed 3D model in accordance with one or more embodiments. The 3D-object-reconstruction system 206 may perform one or more acts of the series of acts 700a in addition to or alternatively to one or more acts described in conjunction with other figures. While FIG. 7A illustrates acts according to one embodiment, alternative embodiments may omit, add to, reorder, and/or modify any of the acts shown in FIG. 7A. The acts of FIG. 7A can be performed as part of a method. Alternatively, a non-transitory computer-readable medium can comprise instructions that, when executed by one or more processors, cause a computing device to perform the acts of FIG. 7A. In some embodiments, a system can perform the acts of FIG. 7A.

As shown in FIG. 7A, the series of acts 700a includes an act 702 of determining a depth map for a real two-dimensional (2D) image depicting a digital object. The series of acts 700a also includes an act 704 of based on the depth map, generating a reconstructed three-dimensional (3D) model of the digital object comprising outer lines conforming to a shape of the digital object by utilizing a 3D-object-reconstruction-machine-learning model trained on a plurality of real 2D images. In addition, the series of acts 700a includes an act 706 of providing, for display within a graphical user interface, a graphical depiction of the reconstructed 3D model or a visual effect derived from the reconstructed 3D model.

It is understood that the outlined acts in the series of acts 700a are only provided as examples, and some of the acts may be optional, combined into fewer acts, or expanded into additional acts without detracting from the essence of the disclosed embodiments. Additionally, the series of acts 700a described herein may be repeated or performed in parallel with one another or in parallel with different instances of the same or similar acts. As an example of an additional act not shown in FIG. 7A, act(s) in the series of acts 700a may include an act of generating the reconstructed 3D model of the digital object by: generating, utilizing the 3D-object-reconstruction-machine-learning model, a predicted signed distance function based on the depth map without a normal map for the real 2D image; and reconstructing the outer lines of the digital object based on the predicted signed distance function.

As another example of an additional act not shown in FIG. 7A, act(s) in the series of acts 700a may include an act of determining the depth map for the real 2D image by utilizing one or more machine-learning models trained to extract monocular depth estimations from the real 2D image.

As a further example of an additional act not shown in FIG. 7A, act(s) in the series of acts 700a may include an act of: identifying the real 2D image by identifying a real image captured by a client device; and determining, according to a view-centric frame of reference, the depth map for the real 2D image based on depth information that is captured by a sensor of the client device and associated with the real image captured by the client device.

In still another example of an additional act not shown in FIG. 7A, act(s) in the series of acts 700a may include an act of providing the visual effect derived from the reconstructed 3D model by: identifying, via the graphical user interface, a user input to modify the real 2D image by repositioning the digital object associated with a shadow; and generating, as the visual effect, a modified shadow that corresponds to the reconstructed 3D model and a modified position of the digital object within the real 2D image.

Additionally, another example of an additional act not shown in FIG. 7A includes act(s) in the series of acts 700a of providing the graphical depiction of the reconstructed 3D model by: providing the graphical depiction of the reconstructed 3D model within the graphical user interface of a 3D image editing application; or providing the graphical depiction of the reconstructed 3D model within an additional 2D image.

Figure 7B:
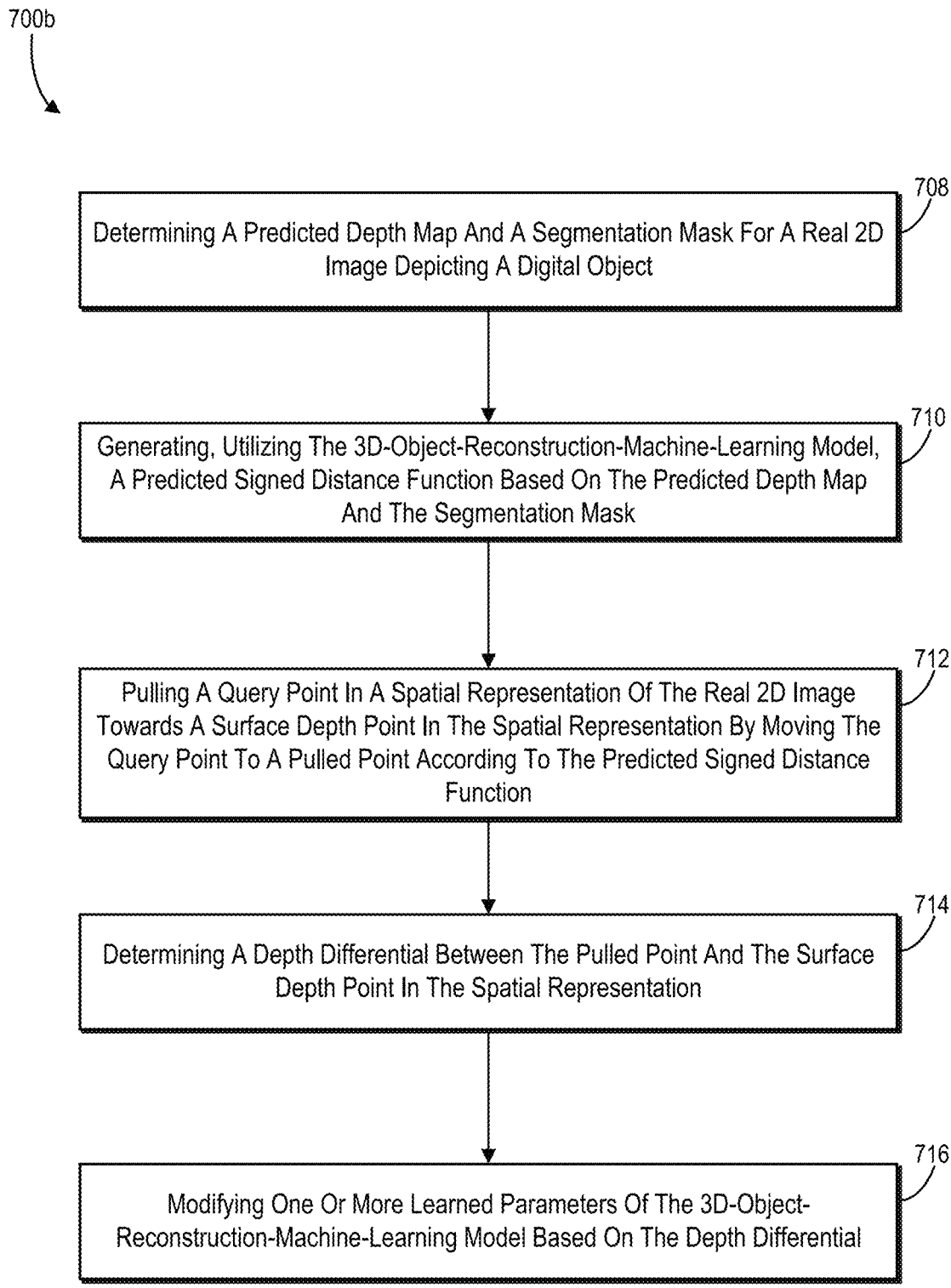
FIG. 7B illustrates a flowchart of a series of actions for training a 3D-object-reconstruction-machine-learning model in accordance with one or more embodiments.

FIG. 7B illustrates a flowchart of a series of acts 700b for training a 3D-object-reconstruction-machine-learning model in accordance with one or more embodiments. The 3D-object-reconstruction system 206 may perform one or more acts of the series of acts 700b in addition to or alternatively to one or more acts described in conjunction with other figures. While FIG. 7B illustrates acts according to one embodiment, alternative embodiments may omit, add to, reorder, and/or modify any of the acts shown in FIG. 7B. The acts of FIG. 7B can be performed as part of a method. Alternatively, a non-transitory computer-readable medium can comprise instructions that, when executed by one or more processors, cause a computing device to perform the acts of FIG. 7B. In some embodiments, a system can perform the acts of FIG. 7B.

In FIG. 7B, the series of acts 700b includes an act 708 of determining a predicted depth map and a segmentation mask for a real 2D image depicting a digital object. Additionally, the series of acts 700b includes an act 710 of generating, utilizing the 3D-object-reconstruction-machine-learning model, a predicted signed distance function based on the predicted depth map and the segmentation mask. Further, the series of acts 700b includes an act 712 of pulling a query point in a spatial representation of the real 2D image towards a surface depth point in the spatial representation by moving the query point to a pulled point according to the predicted signed distance function. In addition, the series of acts 700b includes an act 714 of determining a depth differential between the pulled point and the surface depth point in the spatial representation. The series of acts 700b also includes an act 716 of modifying one or more learned parameters of the 3D-object-reconstruction-machine-learning model based on the depth differential.

It is understood that the outlined acts in the series of acts 700b are only provided as examples, and some of the acts may be optional, combined into fewer acts, or expanded into additional acts without detracting from the essence of the disclosed embodiments. Additionally, the series of acts 700b described herein may be repeated or performed in parallel with one another or in parallel with different instances of the same or similar acts. For example, in particular embodiments, an additional act not shown in FIG. 7B includes act(s) in the series of acts 700b of pulling the query point towards the surface depth point by: determining, utilizing the predicted signed distance function, a signed distance function value for the query point relative to the surface depth point in the spatial representation according to the predicted signed distance function; and pulling the query point in the spatial representation towards the surface depth point according to the signed distance function value and a directional gradient.

As another example of an additional act not shown in FIG. 7B, act(s) in the series of acts 700b may include an act of determining the depth differential between the pulled point and the surface depth point by: determining the pulled point by multiplying the signed distance function value for the query point by the directional gradient; generating a noise-perturbed query point by perturbing the query point according to a noise metric; and determining the depth differential based on the segmentation mask, the noise metric, the signed distance function value, the noise-perturbed query point, and the directional gradient.

In yet another example of an additional act not shown in FIG. 7B, act(s) in the series of acts 700b may include an act of determining the query point and an additional query point in the spatial representation utilizing learned parameters and disparity values between points in the spatial representation and one or more surface depth points in the spatial representation from the predicted depth map.

In a further example of an additional act not shown in FIG. 7B, act(s) in the series of acts 700b may include an act of generating the predicted signed distance function by: generating, utilizing fully connected layers of the 3D-object-reconstruction-machine-learning model, parameters based on a shape feature encoding of the digital object; generating, based on the parameters, conditional batch norm values for a plurality of query points; and assigning signed distance function values to the plurality of query points based on the conditional batch norm values.

Additionally, in another example of an additional act not shown in FIG. 7B, act(s) in the series of acts 700b may include an act of: modifying, in a first training iteration, the one or more parameters of the 3D-object-reconstruction-machine-learning model based on the depth differential; and modifying, in a second training iteration, the one or more parameters of the 3D-object-reconstruction-machine-learning model based on a difference between a predicted signed distance function value and a ground truth signed distance value.

In yet another example of an additional act not shown in FIG. 7B, act(s) in the series of acts 700b may include an act of: determining an additional segmentation mask for a synthetic 2D image depicting an additional digital object; and generating, utilizing the 3D-object-reconstruction-machine-learning model, an additional predicted signed distance function representing predicted signed distance function values between a plurality of query points and additional surface depth points in an additional spatial representation of the synthetic 2D image.

In a further example of an additional act not shown in FIG. 7B, act(s) in the series of acts 700b may include an act of: determining a loss between ground truth signed distance function values and the predicted signed distance function values utilizing a loss function; and modifying the one or more learned parameters of the 3D-object-reconstruction-machine-learning model based on the loss.

In still another example of an additional act not shown in FIG. 7B, act(s) in the series of acts 700b may include an act of: determining the predicted depth map by utilizing a machine-learning model trained to extract monocular depth estimations from real 2D images; and generating, utilizing the 3D-object-reconstruction-machine-learning model, an additional predicted signed distance function representing predicted signed distance function values between a plurality of query points and additional surface depth points in an additional spatial representation of the synthetic 2D image.

In particular embodiments, an additional act not shown in FIG. 7B includes act(s) in the series of acts 700b of: determining a loss between ground truth signed distance function values and the predicted signed distance function values utilizing a loss function; and modifying the one or more learned parameters of the 3D-object-reconstruction-machine-learning model based on the loss.

In another example of an additional act not shown in FIG. 7B, act(s) in the series of acts 700b may include an act of: determining the predicted depth map by utilizing a machine-learning model trained to extract monocular depth estimations from real 2D images; and determining the segmentation mask by utilizing a trained segmentation-machine-learning model to determine a binary selection of a first set of pixels of the real 2D image corresponding to the digital object and a second set of pixels of the real 2D image corresponding to image portions outside of the digital object.

In yet another example of an additional act not shown in FIG. 7B, act(s) in the series of acts 700b may include an act of generating, utilizing the 3D-object-reconstruction-machine-learning model, a predicted signed distance function based on camera position data corresponding to the real 2D image.

In a further example of an additional act not shown in FIG. 7B, act(s) in the series of acts 700b may include an act of: generating a depth map and a segmentation mask for a real two-dimensional (2D) image depicting a digital object; utilizing a three-dimensional (3D)-object-reconstruction-machine-learning model to generate a predicted signed distance function based on the depth map and the segmentation mask; performing a step for determining a depth differential among points in a spatial representation of the real 2D image according to the predicted signed distance function; and modifying one or more learned parameters of the 3D-object-reconstruction-machine-learning model according to the depth differential.

In still another example of an additional act not shown in FIG. 7B, act(s) in the series of acts 700b may include an act of generating the depth map and the segmentation mask by generating the depth map and the segmentation mask with respect to the digital object being positioned in a same orientation as captured in the real 2D image.

In particular embodiments, an additional act not shown in FIG. 7B includes act(s) in the series of acts 700b of utilizing the 3D-object-reconstruction-machine-learning model to generate the predicted signed distance function by generating signed distance function values for query points relative to one or more surface depth points in a spatial representation.

In another example of an additional act not shown in FIG. 7B, act(s) in the series of acts 700b may include an act of determining the query points based on disparity values from the depth map.

In addition (or in the alternative) to acts described above, in certain embodiments, a method can include performing a step for determining a depth differential among points in a spatial representation of the real 2D image according to the predicted signed distance function. For instance, acts and algorithms described above in relation to FIG. 4A can comprise the corresponding acts (or structure) for performing a step for determining a depth differential among points in a spatial representation of the real 2D image according to the predicted signed distance function.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
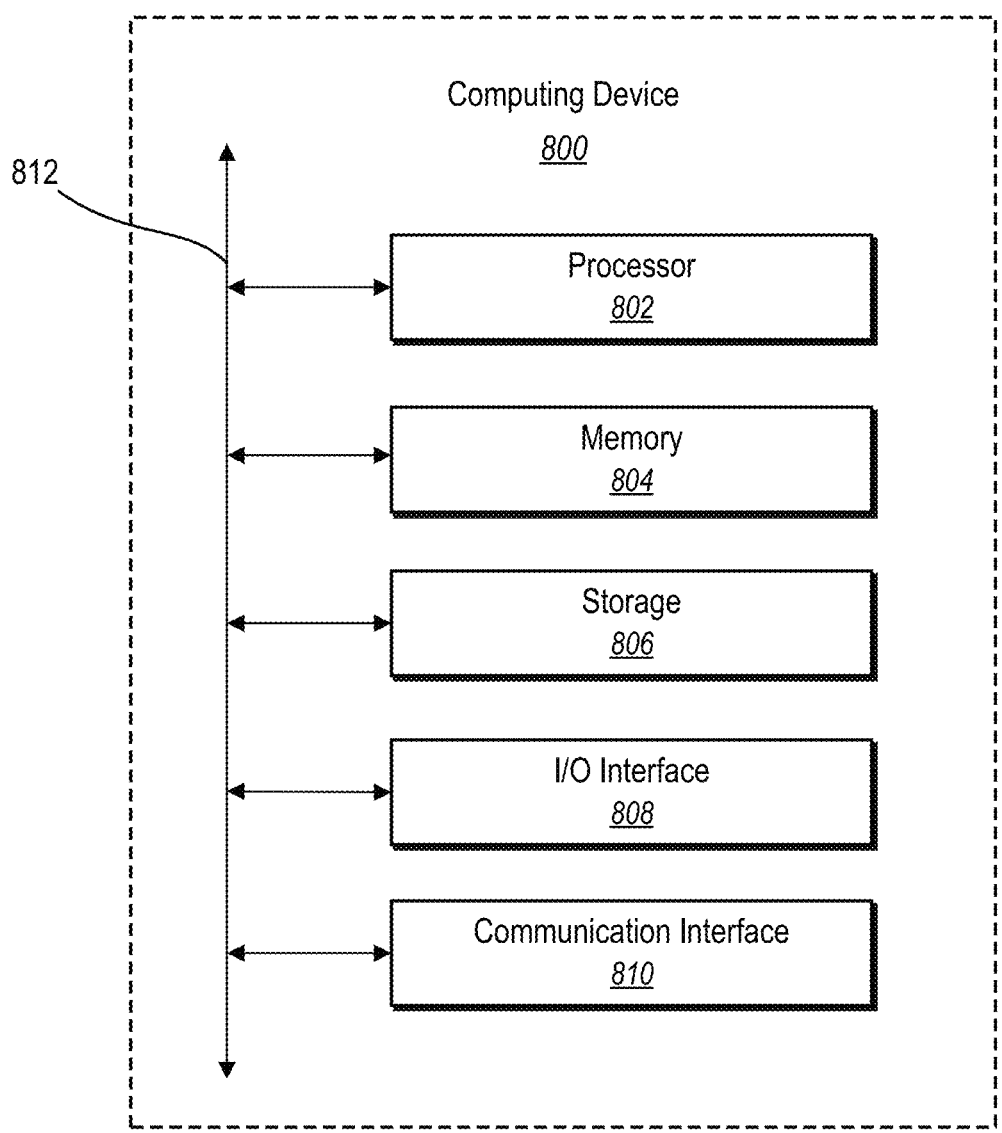
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 202, the client device 208, the third-party server 212, and/or the computing device 600). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to:
   determine a depth map for a real two-dimensional (2D) image depicting a digital object;
   based on the depth map, generate a reconstructed three-dimensional (3D) model of the digital object comprising outer lines conforming to a shape of the digital object by utilizing a 3D-object-reconstruction-machine-learning model trained on a plurality of real 2D images to generate a predicted signed distance function based on the depth map and reconstructing the outer lines of the digital object based on the predicted signed distance function; and
   provide, for display within a graphical user interface, a graphical depiction of the reconstructed 3D model or a visual effect derived from the reconstructed 3D model.

2. The non-transitory computer-readable medium of claim 1, further comprising instructions that, when executed by the at least one processor, cause the at least one processor to generate the predicted signed distance function based on the depth map without a normal map for the real 2D image.

3. The non-transitory computer-readable medium of claim 1, further comprising instructions that, when executed by the at least one processor, cause the at least one processor to determine the depth map for the real 2D image by utilizing one or more machine-learning models trained to extract monocular depth estimations from the real 2D image.

4. The non-transitory computer-readable medium of claim 1, further comprising instructions that, when executed by the at least one processor, cause the at least one processor to:
   identify the real 2D image by identifying a real image captured by a client device; and
   determine, according to a view-centric frame of reference, the depth map for the real 2D image based on depth information that is captured by a sensor of the client device and associated with the real image captured by the client device.

5. The non-transitory computer-readable medium of claim 1, further comprising instructions that, when executed by the at least one processor, cause the at least one processor to provide the visual effect derived from the reconstructed 3D model by:
   identifying, via the graphical user interface, a user input to modify the real 2D image by repositioning the digital object associated with a shadow; and
   generating, as the visual effect, a modified shadow that corresponds to the reconstructed 3D model and a modified position of the digital object within the real 2D image.

6. The non-transitory computer-readable medium of claim 1, further comprising instructions that, when executed by the at least one processor, cause the at least one processor to provide the graphical depiction of the reconstructed 3D model by:
   providing the graphical depiction of the reconstructed 3D model within the graphical user interface of a 3D image editing application; or
   providing the graphical depiction of the reconstructed 3D model within an additional 2D image.

7. A system comprising:
   one or more memory devices comprising real two-dimensional (2D) images and a three-dimensional (3D)-object-reconstruction-machine-learning model; and
   one or more processors configured to cause the system to:
      determine a predicted depth map and a segmentation mask for a real 2D image depicting a digital object;
      generate, utilizing the 3D-object-reconstruction-machine-learning model, a predicted signed distance function based on the predicted depth map and the segmentation mask;
      pull a query point in a spatial representation of the real 2D image towards a surface depth point in the spatial representation by moving the query point to a pulled point according to the predicted signed distance function;
      determine a depth differential between the pulled point and the surface depth point in the spatial representation; and
      modify one or more learned parameters of the 3D-object-reconstruction-machine-learning model based on the depth differential by:
         determining a loss between ground truth signed distance function values and predicted signed distance function values utilizing a loss function; and
         modifying the one or more learned parameters of the 3D-object-reconstruction-machine-learning model based on the loss.

8. The system of claim 7, wherein the one or more processors are configured to cause the system to pull the query point towards the surface depth point by:
   determining, utilizing the predicted signed distance function, a signed distance function value for the query point relative to the surface depth point in the spatial representation according to the predicted signed distance function; and
   pulling the query point in the spatial representation towards the surface depth point according to the signed distance function value and a directional gradient.

9. The system of claim 8, wherein the one or more processors are configured to cause the system to determine the depth differential between the pulled point and the surface depth point by:
   determining the pulled point by multiplying the signed distance function value for the query point by the directional gradient;
   generating a noise-perturbed query point by perturbing the query point according to a noise metric; and
   determining the depth differential based on the segmentation mask, the noise metric, the signed distance function value, the noise-perturbed query point, and the directional gradient.

10. The system of claim 7, wherein the one or more processors are configured to cause the system to determine the query point and an additional query point in the spatial representation utilizing learned parameters and disparity values between points in the spatial representation and one or more surface depth points in the spatial representation from the predicted depth map.

11. The system of claim 7, wherein the one or more processors are configured to cause the system to generate the predicted signed distance function by:
   generating, utilizing fully connected layers of the 3D-object-reconstruction-machine-learning model, parameters based on a shape feature encoding of the digital object;
   generating, based on the parameters, conditional batch norm values for a plurality of query points; and assigning signed distance function values to the plurality of query points based on the conditional batch norm values.

12. The system of claim 7, wherein the one or more processors are configured to cause the system to:
modify, in a first training iteration, the one or more learned parameters of the 3D-object-reconstruction-machine-learning model based on the depth differential; and
modify, in a second training iteration, the one or more learned parameters of the 3D-object-reconstruction-machine-learning model based on a difference between a predicted signed distance function value and a ground truth signed distance value.

13. The system of claim 7, wherein the one or more processors are configured to cause the system to:
determine an additional segmentation mask for a synthetic 2D image depicting an additional digital object; and
generate, utilizing the 3D-object-reconstruction-machine-learning model, an additional predicted signed distance function representing predicted signed distance function values between a plurality of query points and additional surface depth points in an additional spatial representation of the synthetic 2D image.

14. The system of claim 7, wherein the one or more processors are configured to cause the system to generate, utilizing the 3D-object-reconstruction-machine-learning model, the predicted signed distance function based on the predicted depth map and the segmentation mask without a normal map for the real 2D images.

15. The system of claim 7, wherein the one or more processors are configured to cause the system to:
determine the predicted depth map by utilizing a machine-learning model trained to extract monocular depth estimations from real 2D images; and
determine the segmentation mask by utilizing a trained segmentation-machine-learning model to determine a binary selection of a first set of pixels of the real 2D image corresponding to the digital object and a second set of pixels of the real 2D image corresponding to image portions outside of the digital object.

16. The system of claim 7, wherein the one or more processors are configured to cause the system to generate, utilizing the 3D-object-reconstruction-machine-learning model, a predicted signed distance function based on camera position data corresponding to the real 2D image.

17. A computer-implemented method comprising:
generating a depth map and a segmentation mask for a real two-dimensional (2D) image depicting a digital object;
utilizing a three-dimensional (3D)-object-reconstruction-machine-learning model to generate a predicted signed distance function based on the depth map and the segmentation mask;
performing a step for determining a depth differential among points in a spatial representation of the real 2D image according to the predicted signed distance function; and
modifying one or more learned parameters of the 3D-object-reconstruction-machine-learning model according to the depth differential by:
determining a loss between ground truth signed distance function values and predicted signed distance function values utilizing a loss function; and
modifying the one or more learned parameters of the 3D-object-reconstruction-machine-learning model based on the loss.

18. The computer-implemented method of claim 17, wherein generating the depth map and the segmentation mask comprise generating the depth map and the segmentation mask with respect to the digital object being positioned in a same orientation as captured in the real 2D image.

19. The computer-implemented method of claim 17, wherein utilizing the 3D-object-reconstruction-machine-learning model to generate the predicted signed distance function comprises generating signed distance function values for query points relative to one or more surface depth points in a spatial representation.

20. The computer-implemented method of claim 19, further comprising determining the query points based on disparity values from the depth map.

* * * * *